(12) United States Patent
Wang

(10) Patent No.: US 10,048,075 B2
(45) Date of Patent: Aug. 14, 2018

(54) TRAJECTORY DATA COMPRESSION

(71) Applicant: SAP SE, Walldorf (DE)

(72) Inventor: Ting Wang, Singapore (SG)

(73) Assignee: SAP SE, Walldorf (DE)

( * ) Notice: Subject to any disclaimer, the term of this patent is extended or adjusted under 35 U.S.C. 154(b) by 650 days.

(21) Appl. No.: 14/054,845

(22) Filed: Oct. 16, 2013

(65) Prior Publication Data
US 2015/0026142 A1 Jan. 22, 2015

Related U.S. Application Data

(60) Provisional application No. 61/856,059, filed on Jul. 19, 2013.

(51) Int. Cl.
G06F 17/30 (2006.01)
G01C 21/20 (2006.01)

(52) U.S. Cl.
CPC .................................. *G01C 21/20* (2013.01)

(58) Field of Classification Search
None
See application file for complete search history.

(56) References Cited

U.S. PATENT DOCUMENTS

| | | |
|---|---|---|
| 6,401,027 B1 | 6/2002 | Xu et al. |
| 7,667,604 B2 | 2/2010 | Ebert et al. |
| 8,406,998 B2 | 3/2013 | Shaffer et al. |
| 8,604,973 B2 | 12/2013 | Schmidt-Karaca et al. |
| 8,706,727 B2 | 4/2014 | Yang et al. |
| 2009/0146832 A1 | 6/2009 | Ebert et al. |
| 2010/0299064 A1 | 11/2010 | Hilbrandie et al. |
| 2012/0163463 A1 | 6/2012 | Edelhaeusser et al. |
| 2013/0006515 A1 | 1/2013 | Vellaikal et al. |
| 2013/0022234 A1* | 1/2013 | U S ............................ G06T 7/20 382/103 |
| 2013/0304379 A1 | 11/2013 | Fulger et al. |
| 2014/0005916 A1 | 1/2014 | Shen et al. |
| 2014/0164390 A1 | 6/2014 | Hampapur et al. |
| 2014/0180566 A1 | 6/2014 | Malhotra |

FOREIGN PATENT DOCUMENTS

| | | |
|---|---|---|
| CN | 101866545 B | 12/2011 |
| CN | 103278833 A | 9/2013 |

OTHER PUBLICATIONS

Timothy L. Nyerges, Locational Referencing and Highway Segmentation in a Geographic Information System, Mar. 1990, pp. 27-31, ITE Journal.

(Continued)

*Primary Examiner* — Mussa A Shaawat
*Assistant Examiner* — Kyung J Kim
(74) *Attorney, Agent, or Firm* — Jones Day

(57) ABSTRACT

Disclosed is an effective and efficient compression system and technique for large amount of data. The data compression is particularly useful for compressing locational data. The compressed locational data is efficient and effective in tracing a moving object. By selecting appropriate input compression parameters, the accuracy and efficiency of the data compression can be tailored to the needs of the user.

20 Claims, 16 Drawing Sheets

(56) References Cited

OTHER PUBLICATIONS

Natalia Andrienko et al., Properties of Data, Exploratory Analysis of Spatial and Temporal Data, 2006, pp. 31-34, Springer Berlin, Germany.

International Transport Forum, Setting the Scene, Improving Reliability on Surface Transport Networks, 2010, pp. 31-33, OECD.

Graham Wade, PCM signals and systems, Signal Coding and Processing, 1994, pp. 34-37, Cambridge University Press.

Yossi Azar, On-Line Load Balancing, Dept. of Computer Science, pp. 1-18, Springer.

Richard Bellman et al., On the Approximation of Curves by Line Segments Using Dynamic Programming-II, Memorandum, RM-2978-PR, Feb. 1962, United States Air Force.

Richard Bellman, A Multi-Stage Allocation Process, Dynamic Programming, 2003, pp. 10-11, Dover Publications, Incorporated.

Jon Kleinberg et al., Segmented Least Squares: Multi-way Choices, Algorithm Design, 2006, pp. 261-266, Pearson Education.

David H. Douglas et al., Algorithms for the Reduction of the Number of Points Required to Represent a Digitized Line or Its Caricature, Classics in Cartography: Reflections on Influential Articles from Cartographica, 2011, pp. 17-28, John Wiley & Sons, Ltd.

Nirvana Meratnia et al., Spatiotemporal Compression Techniques for Moving Point Objects, Advances in Database Technology, 2004, pp. 765-782, LNCS 2992, Springer-Verlag Berlin Heidelberg.

Michalis Potamias et al., Sampling Trajectory Streams with Spatiotemporal Criteria, 2006, School of Electrical and Computer Engineering, National Technical University of Athens, Hellas.

Falko Schmid et al., Semantic Trajectory Compression, 2009, Springer.

C. Ogilvy, Harmonic Division and Apollonian Circles, Excursions in Geometry, 1990, pp. 17-23, Dover Publications, Incorporated.

Wikipedia, List of world's busiest container ports, http://en.wikipedia.orgiwiki/List_of_world's_busiest_container_ports#cite_note-1, World Port Rankings 2012, American Association of Port Authorities.

International Electrotechnical Commission (IEC), IEC Technical Committee 80: Maritime Navigation and Radiocommunication Equipment and Systems, 2011, Switzerland.

\* cited by examiner

```
 1: procedure OLDCAT_SBE(P', P_t_c, P_t_{c-1})
 2:     if P' = ∅ then
 3:         P_t_c ← B                          ▷ First data point
 4:         P' = {P_t_c}
 5:     else
 6:         t' = max {t|P_t ∈ P'}
 7:         if P_{t'}P_{t_c} > D_{min} then
 8:             if t_c - t_{c-1} > T_{max} then
 9:                 if P_{t'} is S then
10:                     P_t_c ← B              ▷ After a STAY point
11:                     P' = {P_t_c} ∪ P'
12:                 else if P_{t'} is B then
13:                     P_{t'} ← S
14:                     P_t_c ← B              ▷ After a BEGIN point
15:                     P' = {P_t_c} ∪ P'
16:                 else                       ▷ After a Move/TURN point
17:                     P_{t_{c-1}} ← E
18:                     P_t_c ← B
19:                     P' = {P_{t_{c-1}}, P_t_c} ∪ P'
20:                 end if
21:             else
22:                 P_temp = {P_t_c} ∪ P_temp
23:                 call OLDCAT_MT(P', P_t_c, P_temp)
24:             end if
25:         else
26:             P_temp = {P_t_c} ∪ P_temp
27:         end if
28:     end if
29: end procedure
```

Condition 1: lines 3-4
Condition 2: lines 7-8 (Condition 2a: line 7; Condition 2b: line 8)
Case 1: lines 10-11
Case 2: lines 13-15
Case 3: lines 17-19

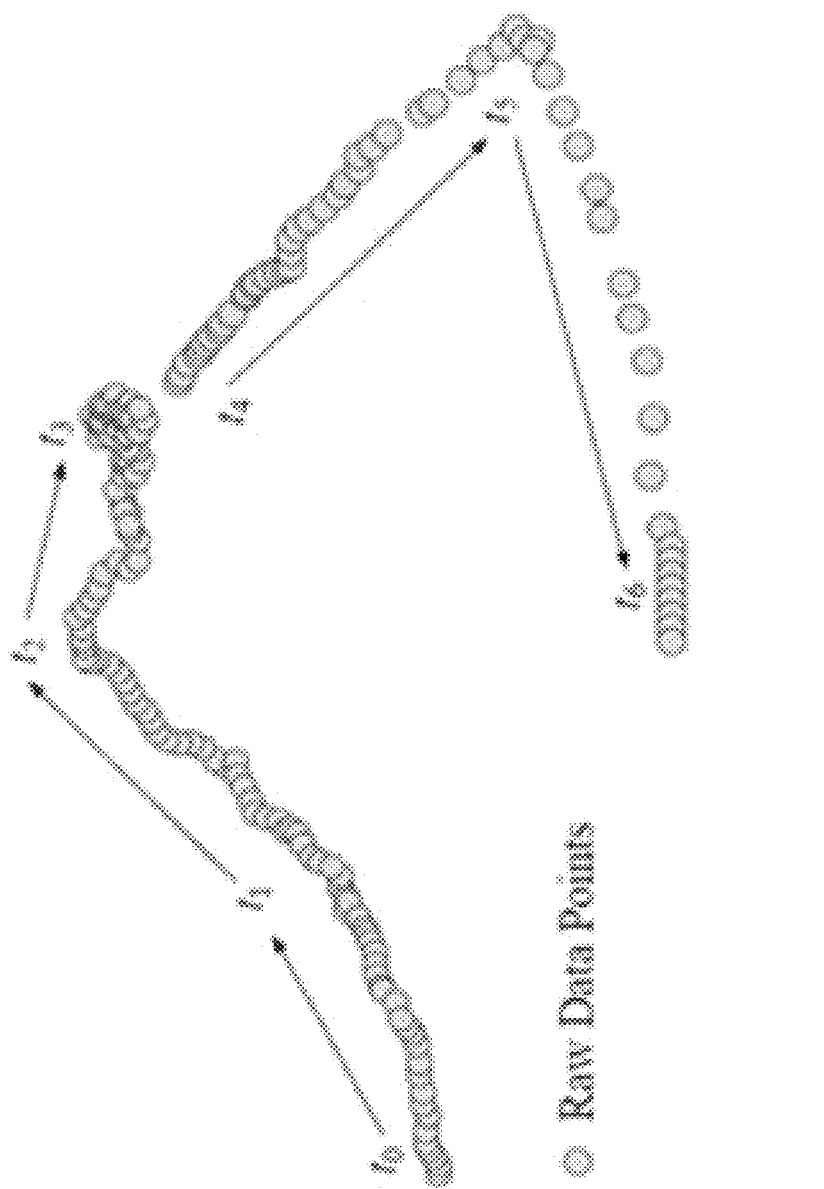

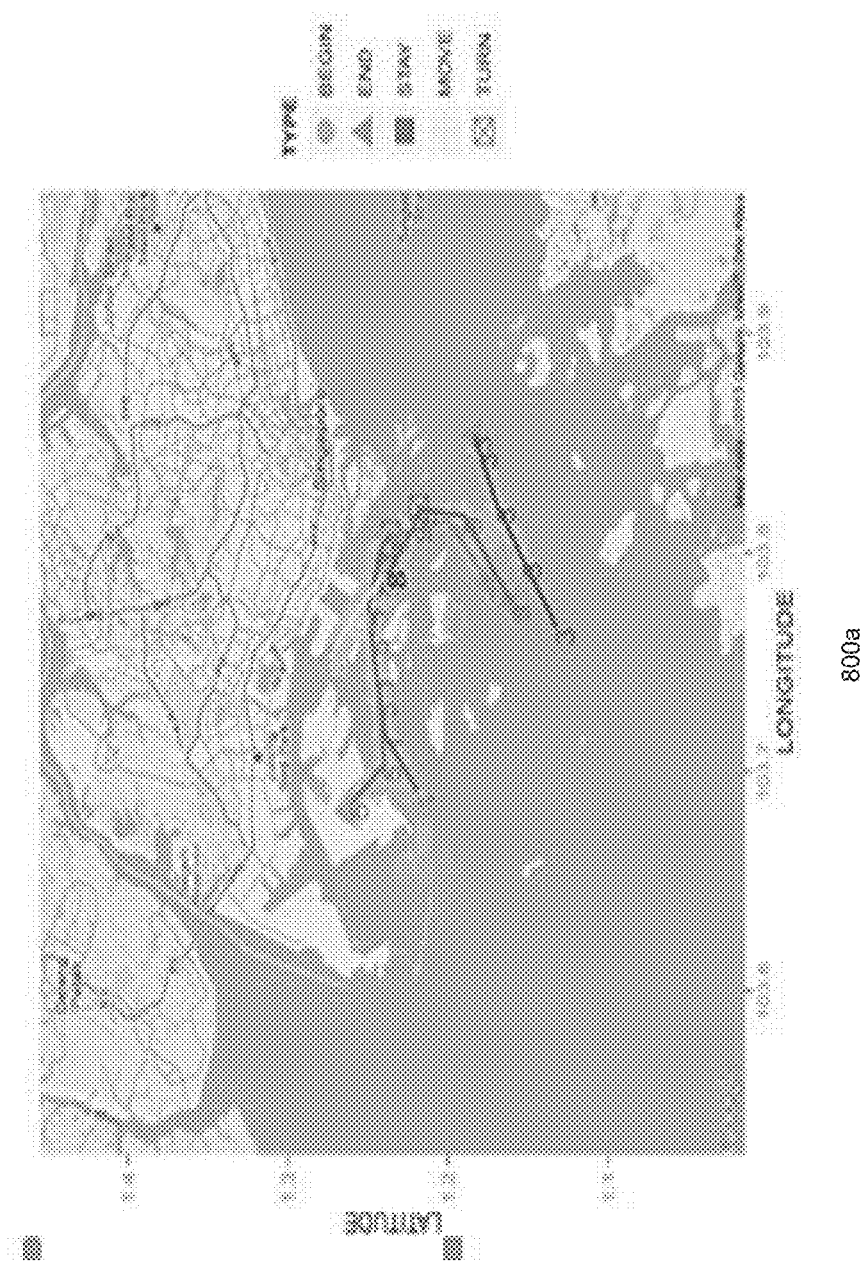

TRAJECTORY DATA COMPRESSION

TECHNICAL FIELD

The present disclosure relates generally to intelligent tools. In particular, an intelligent tool includes a data compressor for compressing data related to the trajectory of objects.

BACKGROUND

Locational data has been pervasive in our daily lives and in scientific research. Generally, locational data involves massive amount of data. In fact, locational data is generally in "Big Data" regime. Locational data is required to obtain details of a moving object, including its trace, velocity and even acceleration. However, the massive amount of data involved with locational data places a heavy burden on analyzing the data. For example, analyzing such large amount of data requires significant amount of time and processing power. In addition, real time analytics of locational data further increases this burden.

From the foregoing discussion, it is desirable to provide effective and efficient processing of massive amount of data, such as locational data.

SUMMARY

A framework for compressing trajectory data is described herein. In accordance with one aspect of the framework, raw trajectory data of an object is provided. The raw trajectory data relates to a trajectory of the object. The raw trajectory data is processed to identify key data points from the raw trajectory data. The key data points include primary key data points and secondary key data points. Data points which are not identified as key data points (non-key data points) are removed from the raw trajectory data. The key data points are stored as a set of compressed trajectory data points P' corresponding to a compressed trajectory of the object, where the compressed trajectory is represented by at least one segment. The primary key data points define ends of the segment, and the secondary key data points are intermediate key data points between ends of the segment.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 6 shows an embodiment of an OLDCAT_SBE procedure;
FIG. 7 shows an embodiment of an OLDCAT_MT procedure with OLIVE.CHK procedure;
FIGS. 9a-f illustrate the impact on compression by adjusting compression parameters;
and
FIGS. 10a-b show an experiment using compression on raw trajectory data of ships.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for compressing trajectory data is described herein. For example, raw trajectory data of one or more objects may be collected and compressed. The compressed trajectory data may be displayed, showing the trajectory of an object or trajectories of multiple objects. The compressed trajectory data may then be analyzed. For example, the compressed trajectory data may be analyzed to develop traffic models or to manage supply chains. Traffic models or traffic analysis can be used for traffic optimization as well as evaluation of traffic regulations while supply chain management may be used to facilitate customer behavioral analysis. Other applications may also be useful from the analysis of trajectory data. The applications may depend on the type of trajectory data collected.

Figure 1:
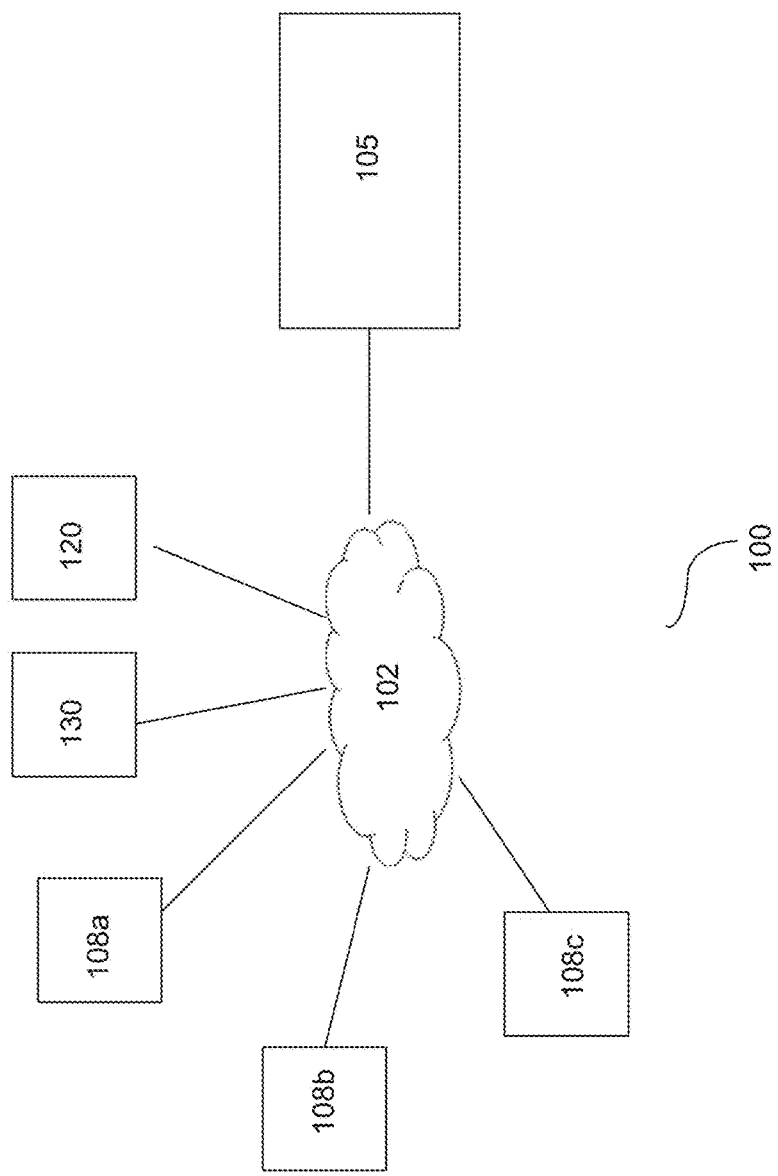
FIG. 1 shows an embodiment of an environment.

FIG. 1 shows a block diagram of an exemplary environment 100. The environment, for example, facilitates trajectory data collection, trajectory data compression and analysis of compressed trajectory data. The environment may have a client/server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients.

The communication network 102, for example, may be a local area network (LAN) which interconnects different devices, such as the clients and the server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, a workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, a local memory and a processor. The memory may include fixed and/or removable storage media such as a magnetic computer disk, a CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, a touch screen, a mouse, or other devices that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interact with the environment for various purposes. For example, the interface may be used to access various applications in the environment. The user interface may also serve other purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as a command line interface (CLI), may also be useful. The type of user interface may depend on the type of application running on the client. For example, the front end portion may include a GUI which enables a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as an email system. Any user may access the user's respective account from any client by performing an authentication or a login process, such as providing a user name and password.

In one embodiment, the environment includes a signal collection system 120. The signal collection system 120, for example, is adopted to collect trajectory data. The signal collection system may be a GPS tracking system or an automatic identification system (AIS) which is used to track ships. Providing other types of trajectory data collection systems may also be useful. For example, the signal collection system 120 may be a WiFi localization system or a mobile phone signal positioning system. The trajectory data may be related to moving objects, such as people, vehicles (including cars, buses, trucks, trains, planes or ships), goods or components. Collecting other types of trajectory data may also be useful.

In some implementations, the signal collection system 120 may collect trajectory data of a plurality of moving objects. Different objects may be differentiated by, for example, an object identifier (ID). Furthermore, the signal collection system 120 may collect trajectory data for a plurality of moving objects of a plurality of types of moving objects. For example, the system may collect trajectory data of different types of moving objects. Different types of objects may be differentiated by their respective object ID as well as movement pattern and speed. Other techniques for differentiating different types of objects may also be useful.

To facilitate collecting trajectory data of different types of moving objects, the signal collection system 120 may include different collection sub-systems. For example, a signal collection sub-system may be configured to collect trajectory data of a type of moving objects. The signal collection sub-systems may be part of a system or separate systems. Providing a signal collection system adapted to collect trajectory data of multiple types of moving objects may also be useful. Other configurations of the trajectory system may also be useful.

In one embodiment, the environment includes a data compression system 130. The data compression system 130 compresses data. In one embodiment, the data compression system 130 is adapted to compress trajectory data. For example, the data compression system 130 includes a data compression application for compressing trajectory data. The data compression system 130 is communicatively coupled to the signal collection system 120. The data compression system 130 may be communicatively coupled to the signal collection system 120 via the communication network 102. Providing a direct communication link between the data compression 130 and signal collection 120 systems may also be useful.

In one embodiment, the data compression system 130 is configured to compress "on-line" trajectory data. For example, trajectory data may be a data stream which is continuously fed to the data compression system 130 for compression. The data stream is compressed, data point by data point in a serial fashion. The data stream is compressed without having the entire input data available from start to end. For example, on-line compression involves analyzing data stream as the object is moving. This enables real time tracking of the object or objects. The data compression system 130 may also be configured to compress "off-line" trajectory data. For example, trajectory data captured over time may be stored as a data file and provided to the data compression system 130 for compression.

The compressed trajectory data may be stored, for example, in a compression database. The compression database, for example, may be located in the memory of the data compression system 130. The compressed data may be subsequently transferred to the memory in the server 105. For example, the compressed data may be subsequently stored in a compression database on the server 105. Other configurations of storing the compressed trajectory data may also be useful.

The environment 100 may also include an application for displaying the compressed data. Additionally, the environment may include one or more applications for performing analytics on the compressed data. The display and analytics applications may be integrated into the data compression system 130. Other configurations of the display and analytics applications may also be useful. Other types of applications may also be provided. The applications, for example, may include business applications as well as communication applications, such as an email application. For example, C/S business applications may include SAP Business Objects applications from SAP AG. Other type of C/S business applications may also be useful.

Figure 2:
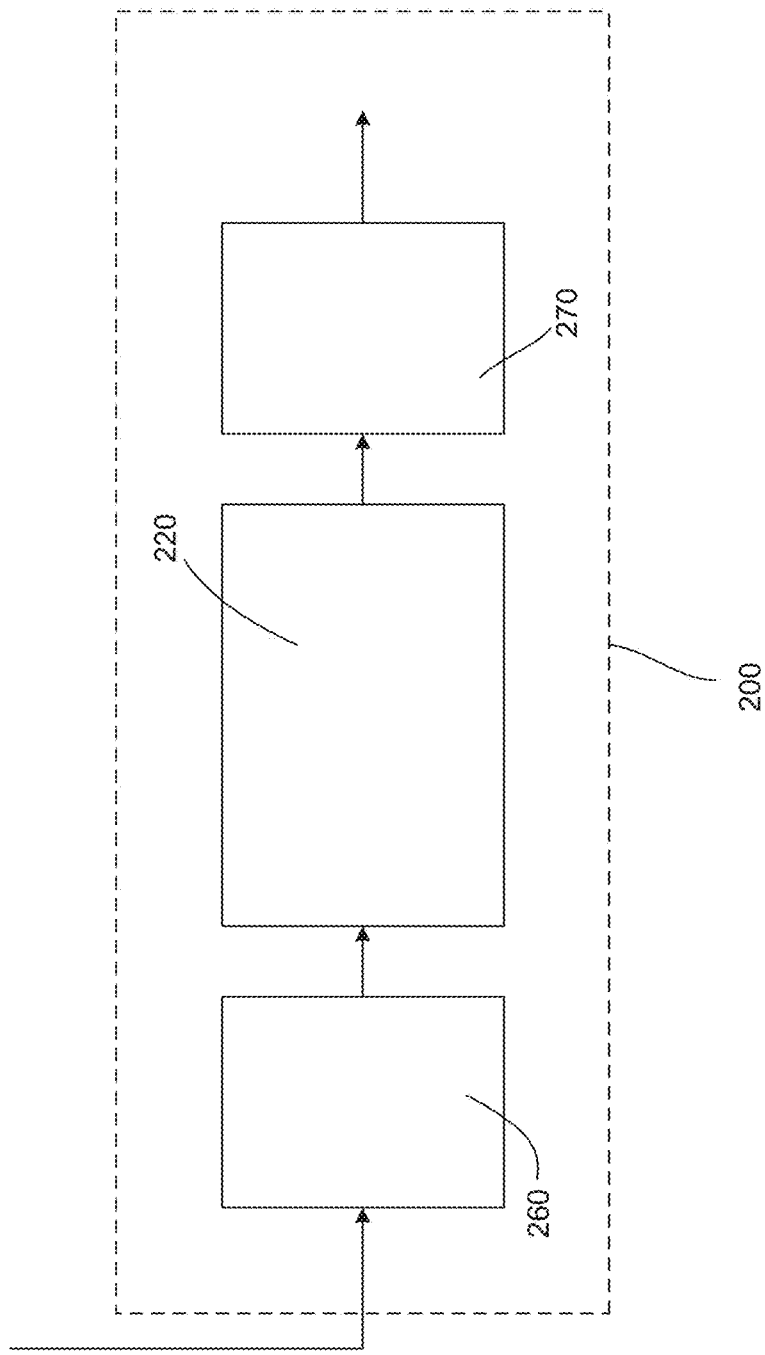
FIG. 2 shows an embodiment of a software environment.

FIG. 2 shows an embodiment of a software environment 200. As shown, the software environment may include an input data source 260, such as a database. Other types of data sources may also be useful. The input data source contains trajectory data. In one embodiment, the input data source contains raw trajectory data of one or more objects. The trajectory data, for example, is provided by signal collection system 120, such as a GPS tracker or an AIS. Other types of signal collection systems may also be useful. The raw trajectory data, for example, may be a data stream of raw trajectory data. The data stream is a continuous stream of data collected and provided to the input data source 260 by the signal collection system 120. Providing a data file containing raw trajectory data may also be useful.

In one embodiment, trajectory data include spatial-temporal data. For example, trajectory data include space and time information. Spatial information may be 2-dimensional (2-D) spatial information. For example, spatial information may include longitude and latitude values. The spatial information alternatively may be 3-dimensional (3-D) spatial information. For example, spatial information may include longitude, latitude and altitude information. Three-dimensional spatial information is particularly useful for tracking movements of, for example, planes. Other configurations of spatial information may also be useful. The spatial information, along with the temporal information, such as a timestamp, can track the movement or trajectory of an object. An object identifier (ID) may be included in the trajectory data to identify the object with which the trajectory data is associated. For example, an object will have a unique ID. This enables trajectory data of multiple objects to be appropriately processed in the software environment 200. Other types of information may also be included in the trajectory data.

In one embodiment, the software environment 200 includes a trajectory data compressor 220. The data compressor 220 compresses trajectory data. The data compressor 220 can be employed to compress on-line trajectory data, such as a data stream. This enables real time tracking of the object or objects by the compressed data. In some implementations, the data stream may include data of multiple objects. The compressor 220 compresses the data stream one object at a time. The data compressor 220 may also be used for off-line compression of trajectory data, such as a data file or data table.

Compressed trajectory data are stored in an output data source 270. The output data source 270, for example, is a database. Other types of data sources may also be useful. Although the input 260 and output 270 data sources are depicted as separate data sources, it is understood that they can be the same data source. Other configurations of the input and output data sources may also be useful.

The software environment 200 may also include an application for displaying the compressed data. Additionally, the environment may include one or more applications for performing analytics on the compressed data. The display and analytics applications, for example, access the compressed trajectory data in the output data source 270. The display and analytics applications may be integrated into the compressor 220. Other configurations of the display and analytics applications may also be useful. For example, the display application may be integrated with the compressor 220 while the analytics application is configured separately from the compressor 220.

The software environment 200 may include other types of data files in a data source and software applications. The data files, for example, may be reports, spreadsheets, XML files, flat files, web service files or other types of files. The data files may be generated from one or more software applications, such as a database or other types of software applications. For example, data may be personal data or business data, such as data of a company. Business data can include employee data, sales data, as well as other types of data related to a company. As for software applications, they may include business applications. Various types of business applications may be used. The business application, for example, maintains data of a business and creates business reports relating to the data. Such business applications may include, for example, SAP Crystal Solutions, including Xcelsius, Crystal Reports, Web Intelligence from SAP AG Other types of applications or suites of applications may also be useful.

Figure 3:
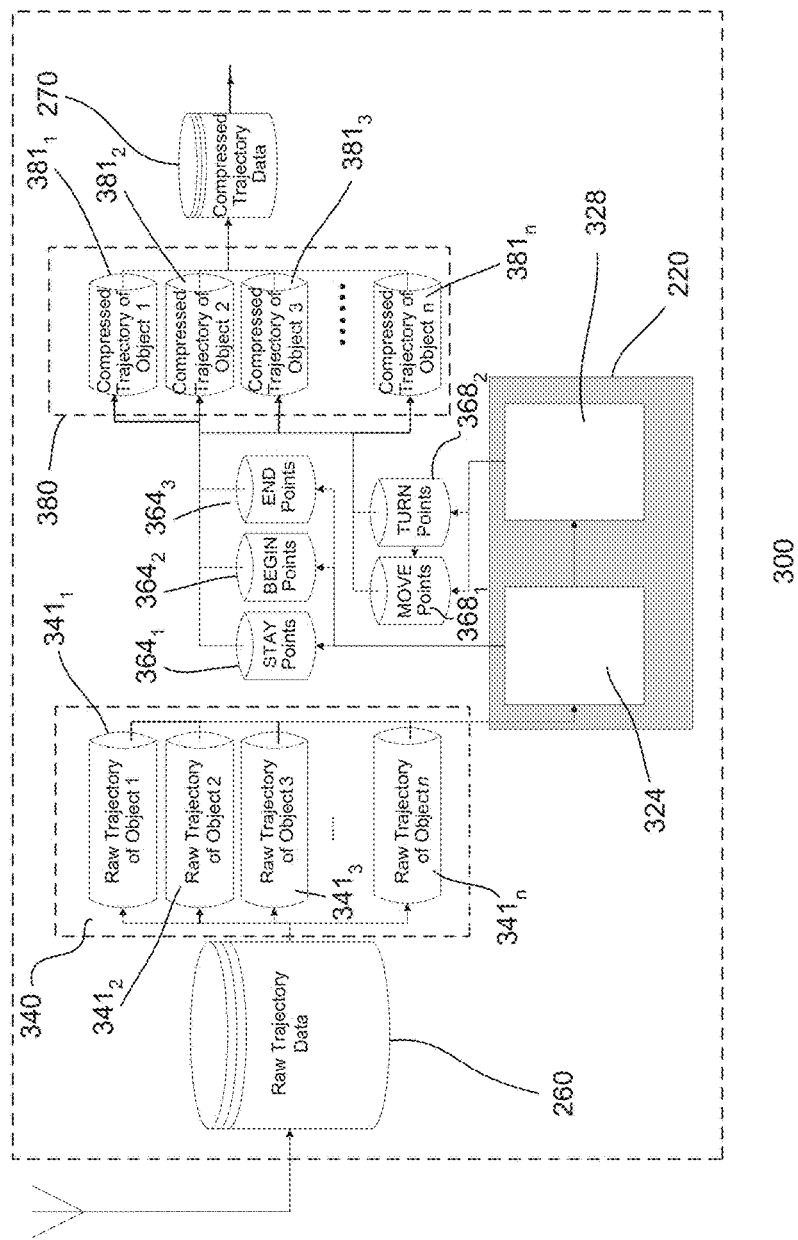
FIG. 3 shows a detailed embodiment of a software environment.

FIG. 3 shows an embodiment of a software environment 300 in greater detail. The software environment 300 is similar to that described in FIG. 2. Common elements may not be described or described in detail.

As shown, the software environment 300 may include an input data source 260, such as a database. Other types of data sources may also be useful. The input data source 260 contains trajectory data. In one embodiment, the input data source 260 contains raw trajectory data of one or more objects. The trajectory data, for example, is provided by signal collection system 120, such as a GPS tracker or an AIS. Other types of signal collection systems may also be useful.

The trajectory data include, for example, 2-D or 3-D spatial-temporal data. For example, trajectory data include space and time information. An object ID may be included in the trajectory data to identify the object with which the trajectory data is associated. Other types of information may also be included in the trajectory data. The raw trajectory data may be contained in a data table. For example, as the raw trajectory data is streamed into the system, the data is placed into the data table in the data source.

The software environment 300 includes a preprocessor 340. The preprocessor 340 preprocesses the raw trajectory data. The raw trajectory data, in one embodiment, is a data stream. The raw trajectory data may be continuously input into the data source 260 as it is collected. The preprocessor 340 separates the raw trajectory data when the data is received. For example, the raw trajectory data may be separated by moving objects based on object IDs. As shown, the raw trajectory data $341_{1-n}$ includes moving objects 1-n. Various techniques may be employed for separating raw trajectory data. For example, filtering by object ID may be used. Other techniques may also be employed. The raw trajectory data, for example, may be queried from a data table by objects or object identifiers (IDs).

The trajectory data is provided to compressor 220 for compression. The compressor 220 compresses the raw trajectory data serially, one data point at a time. In one embodiment, the compressor 220 compresses raw trajectory data of the objects one object at a time. For example, the data stream with data of multiple objects is compressed one object at a time. As new data points are input, they are compressed one object at a time. In one embodiment, the compressor 220 identifies key data points in an object's trajectory sampling. The key points are used to re-construct the object's trajectory or path. As for non-key points they are discarded. This enables reconstruction of the objects trajectory using much fewer data points. For example, the objects trajectory may be reconstructed using a minimum of or significantly reduced data points.

Data compression may be based on compression parameters. In one embodiment, the compression parameters include:
1) $T_{max}$=predefined time constant, which, when exceeded, indicates that an object is stationary;
2) $D_{min}$=minimum distance control parameter to tolerate signal noises and error;
3) $D_{max}$=predefined distance constant, which, when exceeded, determines that the object is moving; and
4) $\theta_{min}$=predefined angle used to determine that the object is turning.

Providing other compression parameters may also be useful. The values of the compression parameters may be selected by the user based on various conditions. For example, a user may select the parameters based on signal quality as well as compression ratio and compression accuracy. Selecting the parameters based on other factors may also be useful. In some cases, the compressor 220 may provide default parameters. The user may override the default parameters if desired.

In compressing the raw trajectory data, an object's trajectory is divided into one or more segments. A segment is a continuous line representing a moving object's trajectory or path. The segment is defined by begin and end key data points. A begin point defines the beginning of a segment while an end point defines the end of a segment. The beginning of a segment represents the beginning of an object's trajectory or movement and the end of a segment represents the end of an object's trajectory or movement.

A segment may include intermediate key data points, such as move and turn key data points, between the begin and end key data points. The intermediate key data points indicate that the object is moving. For example, a move key data point indicates that the object is moving along a direction relative to the last key data point while a turn key data point indicates that the object is turning at an angle greater than a defined angle relative to the last key data point.

A segment may be broken into a series of sub-segments. For example, the sub-segments are a series of connected straight lines which correspond to an object's trajectory or path. A sub-segment is defined by any two consecutive key data points within a segment. For example, two consecutive key data points form a straight line. Trajectory data points between key data points are considered non-key points and are discarded. The speed of the object between key data points may be determined by the distance divided by time between the key data points. Speed may, in some cases, be included as part of trajectory data. The series of sub-segments or straight lines represent or correspond to the object's trajectory.

In the case where the trajectory includes multiple segments, the different segments represent a break in an object's trajectory or movement. The break, for example, may be due to an object remaining stationary for a period greater than a specified amount of time or an interruption in receiving trajectory data. The interruption may be due to, for example, poor signal reception or signal termination. A stay key data point is used to represent that an object is stationary. A stay point, itself, forms a trajectory segment.

In one embodiment, key data points which are terminal points of a segment are referred to as primary key data points. For example, begin, end and stay points are primary key data points. Intermediate key points, such as move and turn points are referred to as secondary key data points. Other designation for key data points may also be useful.

As discussed, the compressor 220 analyzes the data points serially. For example, the data points are analyzed as they are provided to the compressor. A data point with an earlier (smaller) timestamp is analyzed before one with a later (larger) timestamp. Furthermore, the analysis is performed one object at a time. For example, in the case where a raw trajectory data stream include multiple objects, the data stream is analyzed one object at a time. The analysis identifies key data points. In some cases, key data points may be identified after the previous or later data point is analyzed. In one embodiment, the analysis looks backwards to identify move and turn points. In one embodiment, the analysis looks backwards to identify turn points and looks forwards to identify move points. Other techniques for determining key data points may also be useful.

In one embodiment, the compressor 220 includes first and second modules 324 and 328 for determining key points of the trajectory data of an object. In one embodiment, a key point may have one of 5 characteristics. A key point may be a begin point, an end point, a stay point, a move point or a turn point. Providing key points with additional or other characteristics may also be useful. Exemplary characteristics of the key points are described in table 1 below:

TABLE 1

| Point Type | Description |
| --- | --- |
| Stay | Indicates that object has stopped moving and has remained stationary for a period longer than a predefined constant $T_{max}$, which may be defined by the user. |
| Begin | Indicates that a segment of a trajectory has begun. It marks the location where the signal of the object appears after disappearing for a period of time $T_{max}$, or where the object moves off from a stay point for a distance longer than $D_{min}$, where $D_{min}$ is sufficient to tolerate signal noises and errors. $D_{min}$ may be defined by the user. |
| End | Indicates that a segment of a trajectory has ended, such as where the signal fades out or that the object has stopped moving. |
| Move | Indicates that the object is moving forward without making significant turns for a distance longer than a predefined constant $D_{max}$, which may defined by the user. |
| Turn | Indicates that the object has turned at an angle sharper than a predefined value $\theta_{min}$, which may be defined by the user. |

In one embodiment, the first module 324 determines primary key data points, which are stay points $364_1$, begin points $364_2$ and end points $364_3$ from the trajectory data of the object; the second module 328 determines secondary key data points, which are move points $368_1$ and turn points $368_2$ from the trajectory data of the object. Providing other configurations for determining key data points or other types of key points may also be useful.

The key points form a compressed trajectory of an object. In the case where the data stream includes multiple objects, the analysis identifies key data points of compressed trajectories for the multiple objects. A post processor 380 may be provided to configure the compressed trajectory data. The compressed trajectory data may be configured as a data table 381. Configuring the compressed trajectory data in other types of files may also be useful. The data table may include compressed trajectory data 381$_{1-n}$ for the n objects. The compressed trajectory data includes fields of the raw trajectory data, including object identifier identifying the n objects. Additionally, the compressed trajectory data include a field indicating the type of key point of the compressed trajectory data. For example, the compressed trajectory data includes a field indicating that a data point is a S, B, E, M or T point. Other configurations of compressed trajectory data may also be useful.

The compressed trajectory data table may be stored in an output data source 270. The output data source 270, for example, is a database. Other types of data sources may also be useful. Although the input and output data sources are depicted as separate data sources, it is understood that they can be the same data source. Other configurations of the input and output data sources may also be useful. The output data source may be accessed by, for example, display and analytics applications for displaying trajectories and analyzing the trajectory data.

As described, the compressor 220 compresses on-line data. In other embodiment, the compressor 220 compresses off-line trajectory data. For example, a data file containing all raw trajectory data is provided. The data file, for example, may be a data table containing raw trajectory data. The preprocessor 340 may separate the raw trajectory data into separate raw trajectory tables based on objects. For example, the raw trajectory data may be separated into n raw trajectory tables corresponding to n objects. The compressor 220 may compress one raw trajectory table at a time to form compressed trajectory tables corresponding to objects. In other cases, the raw trajectory table may be treated as a data stream and is processed as if it were on-line data. Other configurations of processing off-line trajectory data may also be useful.

In other embodiments, the compressor 220 processes a combination of off-line and on-line data. For example, off-line data may be provided as a data file or table which includes collected data. Off-line data may be collected when the compressor 220 is not initiated. After the off-line data is processed, on-line data is processed. The process which includes processing off-line and on-line data may be considered as on-line processing.

Figure 4:
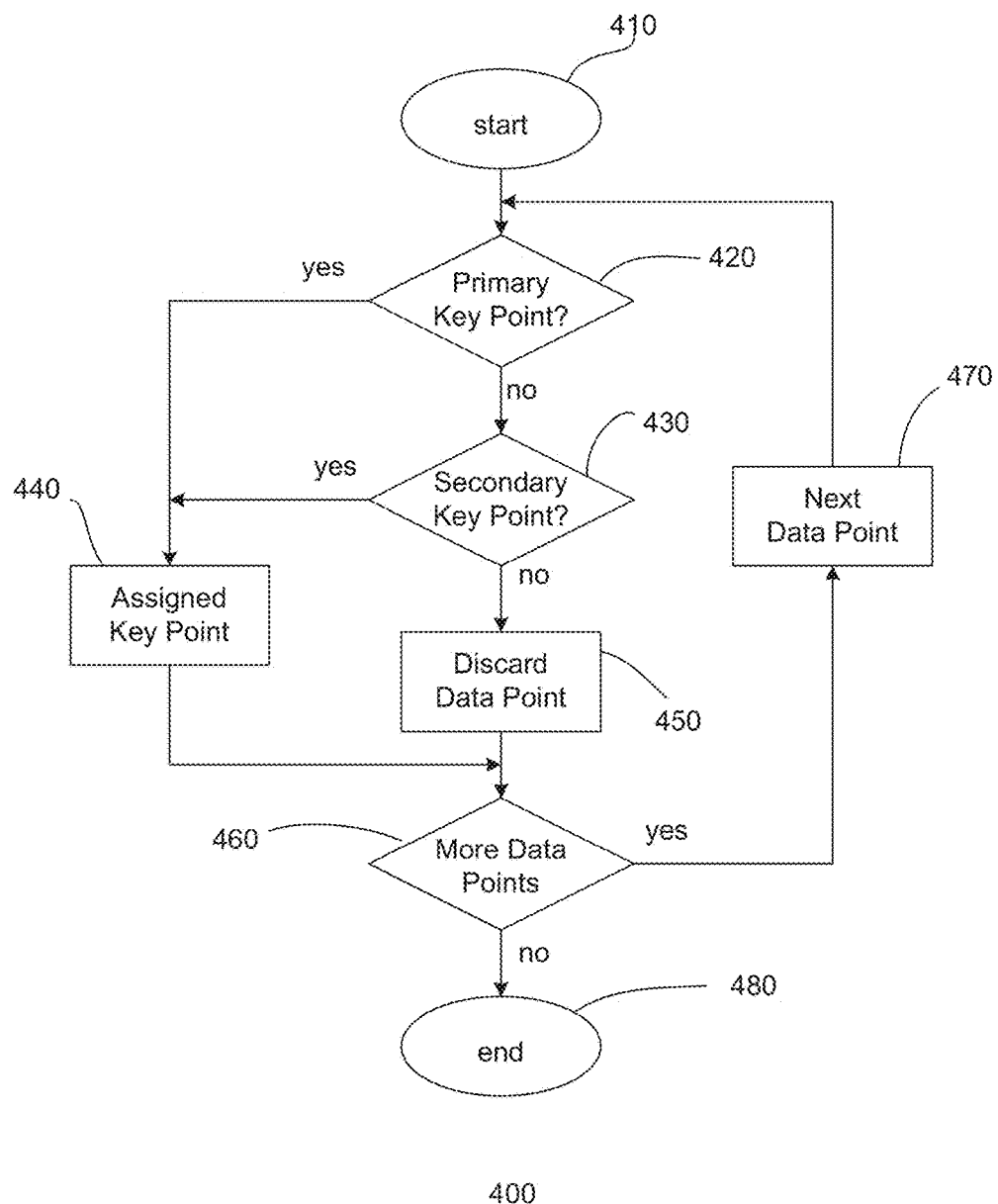
FIG. 4 shows a process for compressing trajectory data of an object.

FIG. 4 shows an embodiment of a process 400 for compressing data. In one embodiment, the process is employed to compress trajectory data. The process described may include similar elements described in FIGS. 1-3. Common elements may not be described or described in detail.

At step 410, data compressor 220 may be initiated to begin the process of compressing data. When initiated, a user may be requested to provide input parameters for compressing trajectory data. The parameters, for example, are provided to compress raw trajectory data. The parameters, in one embodiment, include $T_{max}$, $D_{min}$, $D_{max}$, and $\theta_{min}$. Providing other input parameters may also be useful. The values of the parameters may be selected by the user based on various conditions. For example, a user may select the parameters based on signal quality as well compression ratio and compression accuracy. Selecting the parameters based on other factors may also be useful. In some cases, the compressor 220 may provide default parameters. The user may override the default parameters if desired.

When initiated, raw trajectory data is provided to the compressor 220. For example, raw trajectory data is provided from the data source. The raw trajectory data may be a data stream of raw trajectory data. The data stream may include trajectory data of multiple objects. Receiving data stream of a single object may also be useful. The data stream, for example, may be on-line trajectory data. In such case, the compression is effectively real time compression of data as the data is provided to the system. Other configurations of raw trajectory data may also be useful.

At step 420, the compressor 220 analyzes or processes the trajectory data. In one embodiment, the trajectory data is processed serially, one data point at a time. For example, the trajectory data is processed one data point at a time, from the earliest data point to the latest data point. For trajectory data which includes multiple objects, the trajectory data is processed serially, one object at a time. New trajectory data from the data stream is processed as it is provided to the compressor 220.

In one embodiment, a trajectory data point is analyzed to determine if it is a primary key data point. Primary key data points, in one embodiment, are stay points S, begin points B or end points E. Determining primary key data points, in one embodiment, is performed by the first compressor module 324. The first compressor module 324 includes a first or primary procedure for determining if a data point is a primary key data point. The primary procedure, for example, may be referred to as OLDCAT_SBE.

In describing the compression procedure, the following notations or symbols are used:
  $t_c$=time of data point currently under analysis;
  $t_{c-1}$=time of previous analyzed data point;
  t'=time of last data point added to the set of compressed trajectory points and will be the largest value in the compressed trajectory points;
  P=data point;
  $Pt_c$=current data point under analysis;
  $Pt_{c-1}$=data point which is prior to the data point currently under analysis;
  Pt'=last data point added to the set of compressed trajectory points; and
  P'=set of compressed trajectory data points.

At step 420, the compressor 220 determines if a data point is a primary key data point. For example, the compressor determines if $Pt_c$ is a primary data point. In one embodiment, $Pt_c$ is a primary key data point if either of the following conditions are satisfied:
1) P' is empty; or
2) a) $Pt'Pt_{c-1} > D_{min}$; and
   b) $t_c - t_{c-1} > T_{max}$.

For example, if either 1 or 2 is satisfied, $Pt_c$ is a primary key data point. If none of the conditions is satisfied, $Pt_c$ may not be a key data point. In one embodiment, $Pt_c$ is stored in a temporary buffer $P_{temp}$ (e.g., $Pt_c \cup P_{temp}$) for subsequent analysis to determine the possibility that it may be a key data point.

In one embodiment, if condition 1 or 2 is satisfied, $Pt_c$ is a B point. For example, satisfying condition 1 indicates that $Pt_c$ is the first point of P' and as such, is a B point. As for condition 2a, it indicates that $Pt_c$ is greater than $D_{min}$ away from the last data point of P', which is Pt'. As for condition 2b, it indicates that the time difference between the $Pt_c$ and the previous data point $Pt_{c-1}$ exceeds $T_{max}$. When both 2a and 2b are satisfied, $Pt_c$ is a B point. The different cases for Pt', are listed below:
  Case 1) Pt' is a S point.
  ($Pt_c$ is a B point since it will be the first data point in the next segment)
  Case 2) Pt' is a B point.

(Pt' needs to be changed to a S point since $Pt_c$ is a B point of the next segment); and Case 3) Pt' is a M or T point ($Pt_{c-1}$, which may be in a temporary buffer, is added to P' as an E point since $Pt_c$ is a B point of the next segment.)

If $Pt_c$ is identified as a primary key data point, at step 440, it is added to P'. For example, $Pt_c \cup P'$. In one embodiment, if $Pt_c$ is identified as a primary key data point, it is a B point. Additionally, depending on the situation, Pt' may be changed to a S point (case 2) or $Pt_{c-1}$ is added to P' as an E point (case 3). Data points in P' includes the same fields as those in the raw trajectory data. An additional field may be provided which indicates the type of key data point, such as S, B, E, M or T.

In the case where $Pt_c$ satisfies condition 2a but not 2b, it may be a potential secondary key data point. In such instance, $Pt_c$ is added to $P_{temp}$ (e.g., $Pt_c \cup P_{temp}$) for further analysis. For example, at step 430, $Pt_c$ is analyzed to determine if it is a secondary key data point or not. The analysis may be performed by, for example, a second or secondary procedure of the second compressor module 328. The secondary procedure, in one embodiment, is called or invoked by the primary procedure. Other techniques for invoking the secondary procedure may also be useful. The secondary procedure may be referred to as OLDCAT_MT.

The secondary procedure may be called to determine if $Pt_c$ and other data points in $P_{temp}$ are secondary key data points. Secondary key points include M and T points. Once a data point in $P_{temp}$ is analyzed, it is removed from $P_{temp}$. As such, $P_{temp}$ should be empty after analyzing the data points that it contains. If $Pt_c$ is not a key data point, at step 450, it is discarded. Likewise, any data points in $P_{temp}$ which are not key points are discarded. A key point is added to P' at step 440. For example, key points added to P' may additionally include key point type.

In determining a secondary key data point, the process uses "forward looking" and "backward looking". In forward looking, the next data point is used to determine whether the current data point is a secondary key data point or not while in backward looking, the previous data point is used to determine if the current data point is a secondary key data point or not. In one embodiment, forward looking is used to determine if $Pt_c$, the current data point, is a M point, and backward looking to determine if other data points in $P_{temp}$ may be T points.

In one embodiment, a M point is first determined by the second procedure. For example, $Pt_c$ is analyzed to determine if it is a M point. If the following condition is satisfied, $Pt_c$ is a M point:

$$Pt'Pt_c > D_{max}$$

where $Pt'Pt_c$ is the distance between $Pt_c$ and the last data point Pt' of P'. As discussed, $D_{max}$ may be set by the user. If $Pt_c$ is a M point, it is added to P'. If not, $Pt_c$ is added back to $P_{temp}$.

Next, the procedure determines if there is a T point by looking back. In one embodiment, the process looks back at data points collected in time interval [t', $t_c$], which are stored in $P_{temp}$ by the first procedure. For example, $P_{temp}$ contains points having a timestamp starting from t' and ending with $t_c$.

Figure 5:
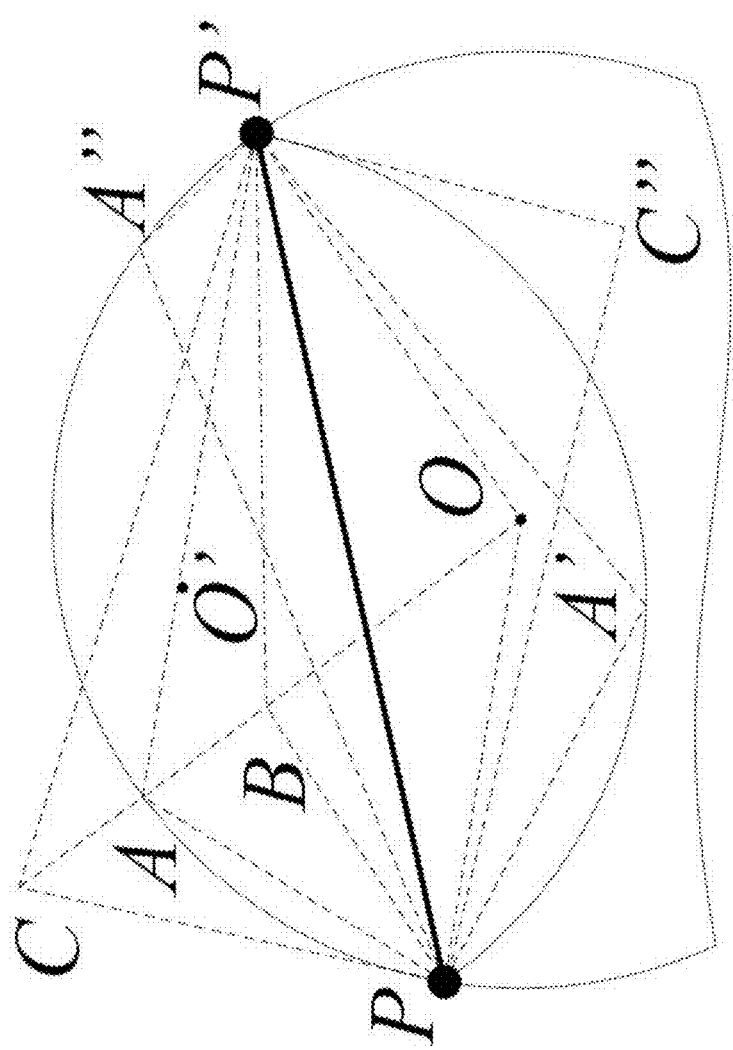
FIG. 5 illustrates the Inscribed Angle (IA) Theorem.

To understand how T points are identified, some geometric theorems are introduced. The first Theorem is the Inscribed Angle (IA) Theorem. An angle θ inscribed in a circle is half of the central angle 2θ that subtends the same arc on the circle. As such, the angle does not change as its apex is moved to different positions on the circle. For example, as shown in FIG. 5, assume P and P' are points on a circle centered at O. According to the IA Theorem, ∠PA"P'=∠PAP'. Moreover, from the IA Theorem, an IA Corollary can be derived. The IA Corollary, where for the same arc, if the apex is located inside the given circle, the angle will be larger than the inscribed angle; otherwise if it is located outside, it will be smaller than the inscribed angle.

Using the inscribed angle ∠PAP' shown earlier, the IA Corollary can be proved. Points B and C are on the line segment of OA and its extension, respectively. In ΔPAB, its exterior angle is:

$$\angle OBP = \angle BAP + \angle APB > \angle PAB.$$

Similarly, ΔP'AB have:

$$\angle OBP' > \angle P'AB.$$

Thus the following:

$$\angle PAP' = \angle PAB + \angle BAP' < \angle PBO + \angle OBP' = \angle PBP'$$

According to the IA Theorem, ∠LP'BP is larger than any inscribed angle that subtends the same arc with ∠PAP'. Using the same principle, we can show that:

$$\angle PCP' = \angle PCA + \angle ACP' < \angle PAB + \angle BAP' = \angle PAP'$$

Thus for any given apex located inside (e.g., B) or outside (e.g., C) the circle, the corresponding inscribed angle (e.g., ∠PAP') can always be located by connecting the circle center with the point and extend, and the IA Corollary is found to be true.

Due to symmetry, on the other side of line segment PP', another circle center other than O (denoted as O') can be found with a corresponding arc, PA'P. From the IA Theorem and IA Corollary, ∠PA' P'>∠PC" P'.

Thus, based on the above, it can be concluded that for any point, namely B, located inside the "olive" shape PA'P'A"A (which is in fact an equal-circle-intersection area), ∠PBP'>∠PAP'; for point C outside this area, ∠PCP'<∠PAP'. Moreover, using analytical geometry techniques, given coordinates of P and P', and the size of ∠PAP', the coordinates of O can be obtained, and thus determine whether or not a given point is inside the olive area or outside.

To determine T points, a turn procedure may be employed. In one embodiment, a turn procedure is called by the secondary procedure to determine a T point after a M point has been identified. The turn procedure is referred to as an OLIVE.CHK procedure. The OLIVE.CHK procedure is called by the OLDCAT_MT procedure.

As discussed, the secondary procedure first identifies a M point. For example, consider points P and P' in FIG. 5 as two different data points in the raw trajectory data of an object separated by time t. Since it is separated by time t, there could be a series of other data points between them. The turn procedure can be used to identify points where the object has made significant turns. For example, turns with angle sharper than $\theta_{min}$ are determined as T points and are added to P'.

The secondary procedure, in one embodiment, identifies a M point by determining if $Pt_c$, the current data point is at least $D_{max}$ away from Pt' in P'. If not, $Pt_c$ is added to $P_{temp}$. On the other hand, if $Pt_c$ is a M point, it is added to P'. Once $Pt_c$ is identified as a move point, the process analyzes $P_{temp}$ to determine if any data point in $P_{temp}$ is a turn point. A data point qualifies as a T point if the following criteria are satisfied:

1) Data point is at least $D_{min}$ away from Pt';
2) Data point is at least $D_{min}$ away from $Pt_c$; and 3) Data point is located outside the "olive area" defined by Pt', $Pt_c$, and $\theta_{min}$.

The value of $D_{min}$ is selected to tolerate for signal noises and errors.

The analysis is performed on all data points in $P_{temp}$. In one embodiment, the data points are analyzed in sequence, from oldest to newest. Determination of whether a data point is a turn point is performed by, for example, the turn procedure. If a data point in $P_{temp}$ is determined to be a T point, it is added to P'. Otherwise, it is deleted from $P_{temp}$. The process repeats until all data points in $P_{temp}$ are analyzed. At the end of the analysis, $P_{temp}$ will be empty.

After analyzing $Pt_c$, the process proceeds to step 460 to determine if there are more data points to process. If there are, the process returns to step 420. On the other hand, if all data points have been processed, the process proceeds to step 480 where it is terminated.

The key data points form a compressed trajectory of an object. In the case where the data stream includes multiple objects, the analysis identifies key data points of compressed trajectories for the multiple objects. A post processor 380 may be provided to configure the compressed trajectory data. The compressed trajectory data may be configured as a data table 381. Configuring the compressed trajectory data in other types of files may also be useful. The data table may include trajectory data $381_{1-n}$ for the n objects. The compressed trajectory data includes fields of the raw trajectory data, including object identifier identifying the n objects. Additionally, the compressed trajectory data include a field indicating the type of key data point of the compressed trajectory data. For example, the compressed trajectory data includes a field indicating that a data point is a S, B, E, M or T point. Other configurations of compressed trajectory data may also be useful.

Figure 7:
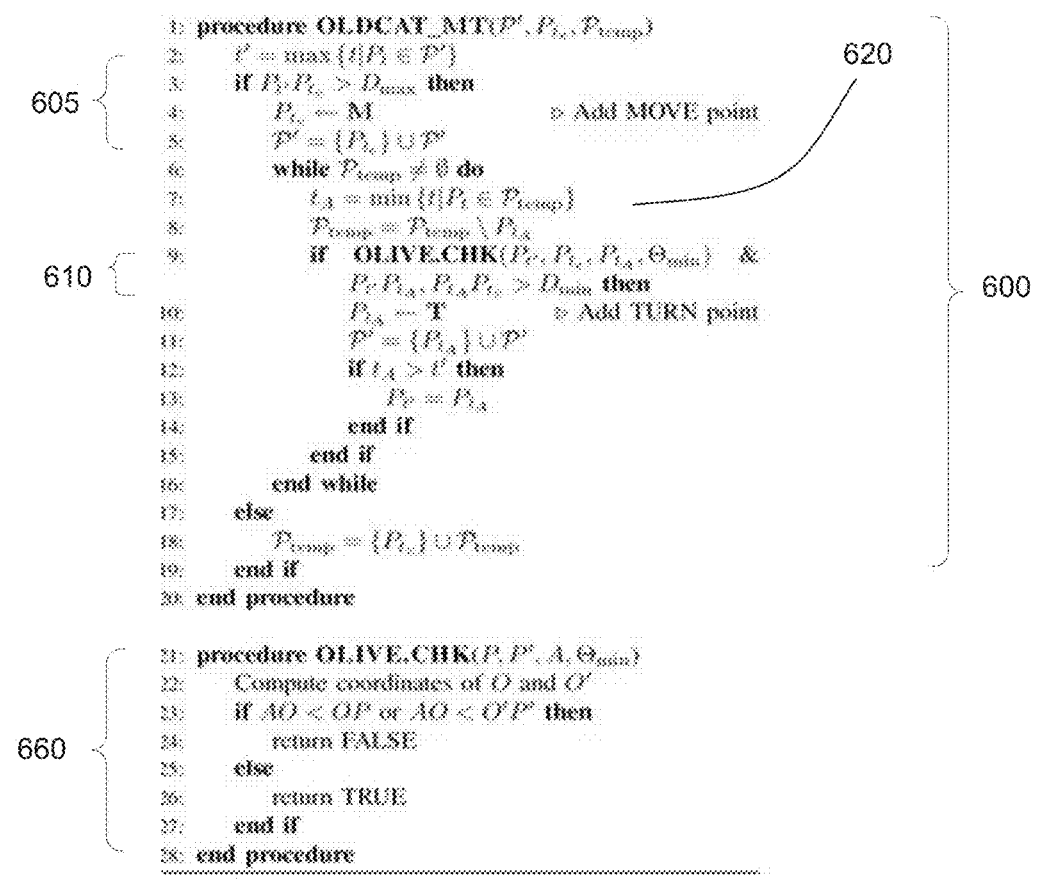

FIG. 6 shows an embodiment of an OLDCAT_SBE procedure 500 while FIG. 7 shows an embodiment of an OLDCAT_MT procedure 600 and an embodiment of OLIVE.CHK procedure 660.

Referring to FIG. 6, the portions of the procedure related to conditions 1 and 2 (including 2a and 2b) as well as case 1, case 2 and case 3 are depicted. For example, if either 1 or 2 (2a and 2b) is satisfied, $Pt_c$ is a primary key data point. In one embodiment, if either condition 1 or 2 is satisfied, $Pt_c$ is a B primary key data point. When $Pt_c$ is a B primary key data point, it is added to P' (e.g., $Pt_c \cup P'$).

In one embodiment, when condition 2 is satisfied, Pt' may be a primary key data point. For example, Pt' may be a S or B point. If Pt' is a S point, as in case 1, then $Pt_c$ becomes a B point and is added to P'. If Pt' is a B point, as in case 2, then Pt' is changed to a S point while $Pt_c$ is added to P' as a B point. On the other hand, as in case 3, if Pt' is not a primary key data point, then it is a secondary key data point (e.g., Pt' is a M or T point). In this instance, $Pt_{c-1}$ becomes an E point, $Pt_c$ is a B point and $Pt_{c-1}$ and $Pt_c$ are added to P'. If none of the conditions is satisfied, $Pt_c$ may not be a key data point. In one embodiment, $Pt_c$ is stored in a temporary buffer $P_{temp}$ (e.g., $Pt_c \cup P_{temp}$) for subsequent analysis to determine the possibility that it may be a key data point. If condition 2a is satisfied but not condition 2b, $Pt_c$ is stored in a temporary buffer $P_{temp}$ and analyzed. In one embodiment, $P_{temp}$ is analyzed by calling OLDCAT_MT to determine if there are any M and T points in $P_{temp}$.

Referring to FIG. 7, a first section 605 of OLDCAT_MT determines whether the current data point $Pt_c$ is a M point. If $Pt_c$ is not determined as a M point, it is deleted from $P_{temp}$. If $Pt_c$ is a M point, it is added to P'. A second portion 610 of OLDCAT_MT determines if any data point in $P_{temp}$ is a T point. In one embodiment, the data points in $P_{temp}$ are analyzed one data point at a time, from earliest to newest, as indicated by the while loop 620. The data point in $P_{temp}$ which is analyzed is referred or assigned a $Pt_A$.

The OLIVE.CHK procedure 660 is called by OLD-CAT_MT to determine if $Pt_A$ is a T point or not. If $Pt_A$ is determined to be a T point, it is added to P'. In one embodiment, if the OLIVE.CHK procedure determines that $Pt_A$ is a T point, it is not added to P' unless it satisfies criteria 1 and 2, as discussed above. If it does, then the data point is added to P'. If not, it is discarded. When a $Pt_A$ is added to P', it may be possible that $Pt_A$ may be Pt'. For example, in the event that $t_A$>t', $Pt_A$ will be Pt'. This results in $Pt_A$ to be used for analysis regarding Pt' in the next analysis, such as in line 9 of OLDCAT_MT. The secondary procedure ends when all data points in $P_{temp}$ has been analyzed, emptying $P_{temp}$.

The accuracy of a data compression system is determined by the amount of information lost during compression/sampling process. The loss of too much data, for example, may cause blind spots. Blind spots, for example, are areas in which the location or direction change of the object may not be detected due to loss of data from compression. In this case, a blind spot is the "Olive Area" between two consecutive data points.

The accuracy and error tolerance of the compressor may be adjusted by various input parameters. In one embodiment, the accuracy and error tolerance of the compressor may be adjusted using compression parameters $D_{max}$, $D_{min}$, $T_{max}$ and $\theta_{min}$. Adjusting the accuracy and error tolerance of the compressor 220 using other parameters may also be useful. The parameters may be adjusted to reduce or minimize blind spots.

Figure 8:
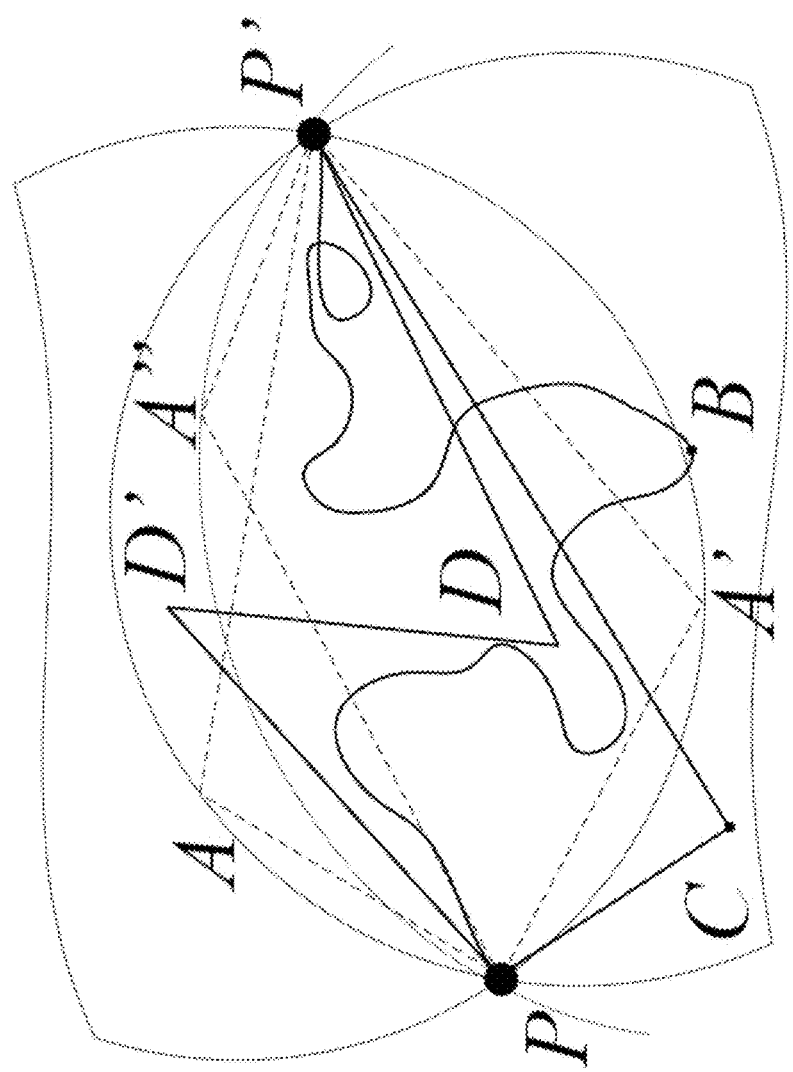
FIG. 8 illustrates how accuracy and error tolerance may be impacted by compression parameters.

FIG. 8 illustrates how accuracy and error tolerance may be impacted by the compression parameters. Various points A, A', A", B, C, D, D', P and P' are shown. Assume that P and P' are two data points separated by the distance $D_{max}$. The Olive Area may be defined by $\angle PAP' = \angle PA'P' = \theta_{min}$. Data point C is outside the blind spot and may be considered a T point. However, data point D and D' will be disregarded, even though the object is making sharper turns at these point, due to the fact that they are located in the blind spot. Similarly, a lot of details of the curvature trace from P to B and then to P' could be lost since they are in the blind spot. The compression may erroneously track the trajectory as line segments PB and BP'.

Adjusting the compression parameters may increase the accuracy of the compression by decreasing the size of the blind spot. The size of the blind spot may be defined by the following equation 1:

$$A_b = d^2\left(1 - \frac{\theta}{\pi} - \sin 2\theta\right)\sec^2\theta \qquad \text{Equation 1}$$

where:
  $A_b$=size of the blind spot;
  d=$D_{max}$;
  $\theta$=$\theta_{min}$; and
  sec=secant From equation 1, $\theta_{min}$ and/or $D_{max}$ may be adjusted to decrease the size of the blind spot, thereby increasing compression accuracy. In one embodiment increasing $\theta_{min}$, and/or decreasing $D_{max}$ decreases the blind spot. For example, by increasing $\theta_{min}$ the arc from P to P' lowers D', causing it to be identified as a T point. On the other hand, increasing $D_{max}$ results in fewer T points being classified. By adjusting the parameters, increased number of data points will be added in P' to increase accuracy. However, accuracy is achieved at the expense of compression ratio. A user may select the parameters to adjust for the desired accuracy, while balancing compression ratio.

Another blind spot is from the $D_{min}$ parameter. This is because a current data point $Pt_c$ within $D_{min}$ of Pt' is disregarded. As discussed, $D_{min}$ is set at a value to tolerate signal noises and errors. For example, a larger $D_{min}$ will result in lesser amount of data points and vice versa. However, the user may define $D_{min}$ to be as small as possible, based on signal noises and errors of the signal collection system.

FIGS. 9a-f illustrates the effect of the compression parameters on the compressed trajectory data. The data points, as shown, are collected from an AIS corresponding to movement of a ship. However, it is understood that other type of signal collection systems and/or for other types of moving objects may also be useful.

Referring to FIG. 9a, a graph 700a of raw trajectory data points of a moving object is shown. The data points are, as shown, represented by round circles. For purpose of illustration, points $t_0$-$t_6$ with arrows are provided to depict the direction of travel of the object. As illustrated, the objects movement is represented by over 200 data points.

Figure 9B:
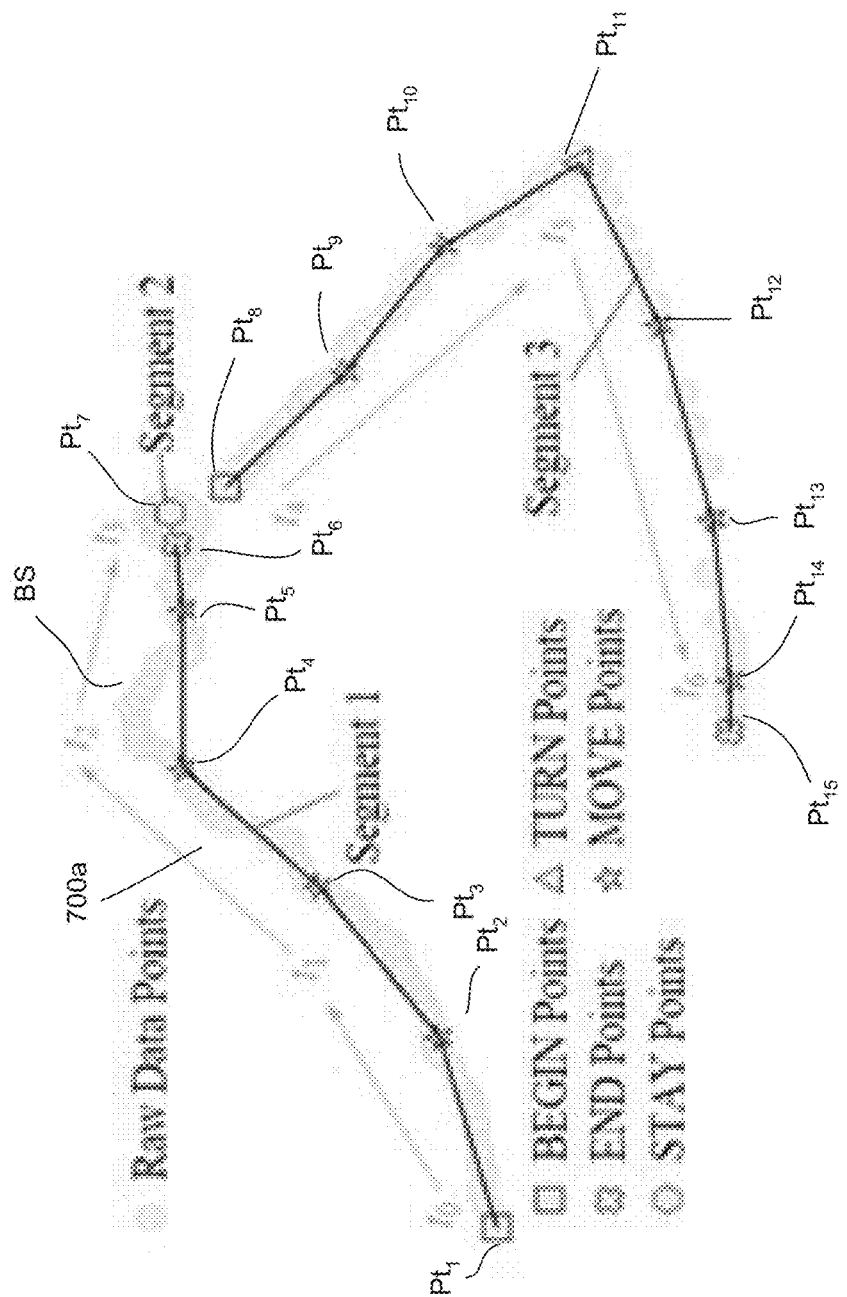

In FIG. 9b, the raw data points are processed by compressor 220, as described, to produce a set of compressed data points P'. As shown, P' includes fifteen data points $Pt_1$-$Pt_{15}$. The compression is performed using a reference set of $D_{max}$, $D_{min}$, $T_{max}$ and $\theta_{min}$ values, resulting in a reference compressed trajectory. The reference compressed trajectory is transposed over the raw data trajectory 700a (shadowed). As shown, the reference compression produces three segments. Segment 1 includes $Pt_1$-$Pt_6$, segment 2 includes $Pt_7$ while segment 3 includes $Pt_8$-$Pt_{15}$. Regarding segment 1, it includes $Pt_1$ as a B point and $Pt_6$ as an E point, with $Pt_2$-$Pt_5$ as M points. The first segment includes no turn points because none of the points satisfy the criteria for turn points based of the reference compression parameters, such as $\theta_{min}$. The data point $Pt_7$ is a S point, forming segment 2. As for segment 3, $Pt_8$ is a B point, $Pt_{11}$ is a T point and $Pt_{15}$ is an E point, with the remaining points being M points. Illustratively, the reference compression parameters produces a compressed trajectory which tracks the raw data trajectory fairly well, except for a blind spot BS between $Pt_4$ and $Pt_5$. Using the reference compression parameters, a fairly accurate tracking is achieved with 15 data points versus over 200 raw data points.

Figure 9C:
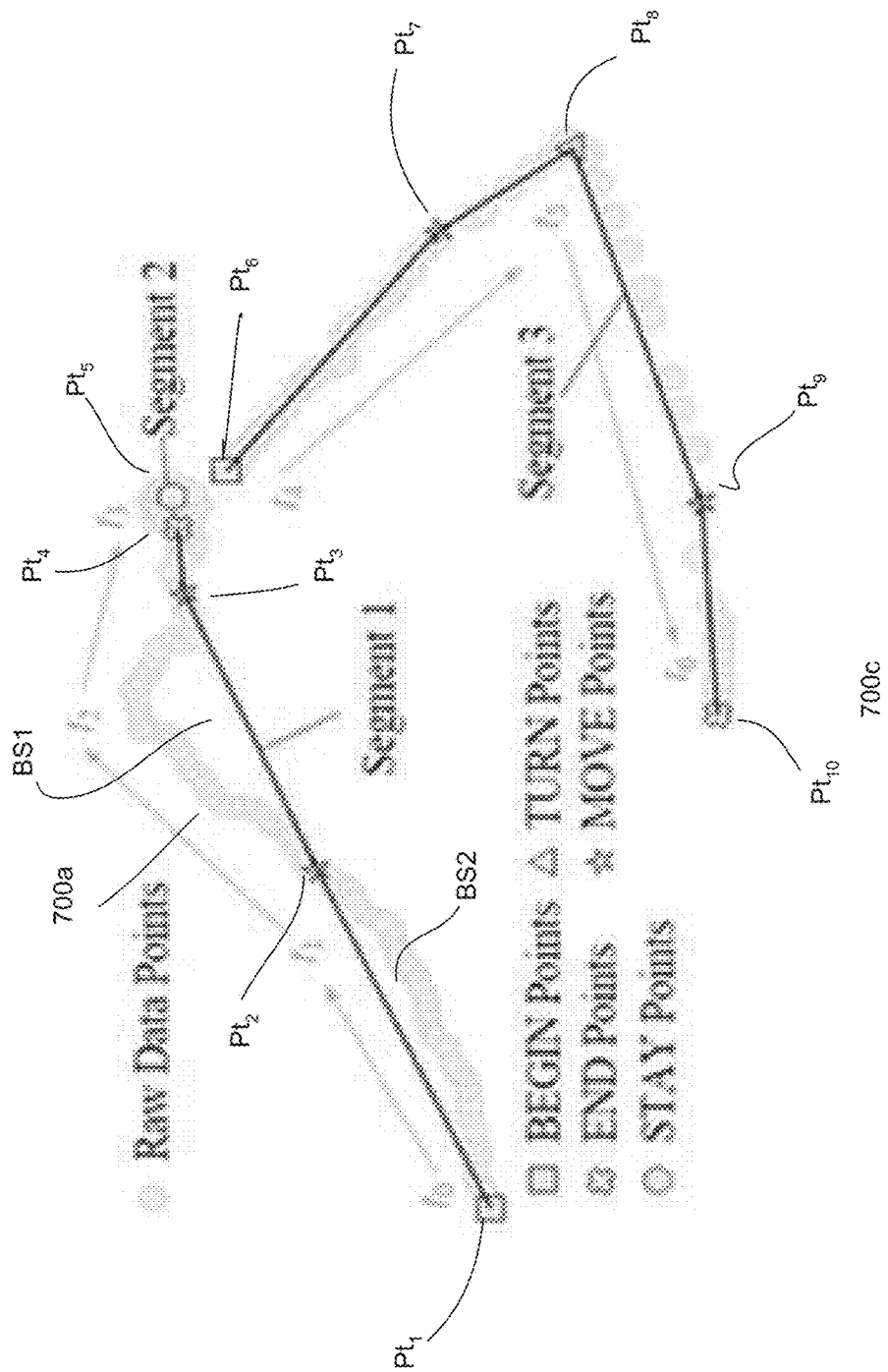

Referring to FIG. 9c, a compressed trajectory 700c is shown. The compressed trajectory is transposed over the raw data trajectory 700a (shadowed). The compressed trajectory is produced by increasing $D_{max}$, resulting in compressed data points having a larger separation distance. As such, the trajectory is defined by less data points. For example, the compressed trajectory is represented by $Pt_1$-$Pt_{10}$, ten data points as compared to fifteen for FIG. 9b. Similar to FIG. 9b, three segments, segments 1-3, are produced. Segments 2-3 track the raw data trajectory fairly well. However, segment 1 has two blind spots, BS1 and BS2. Thus, less data points are used at the expense of accuracy, as compared to the reference trajectory.

Figure 9D:
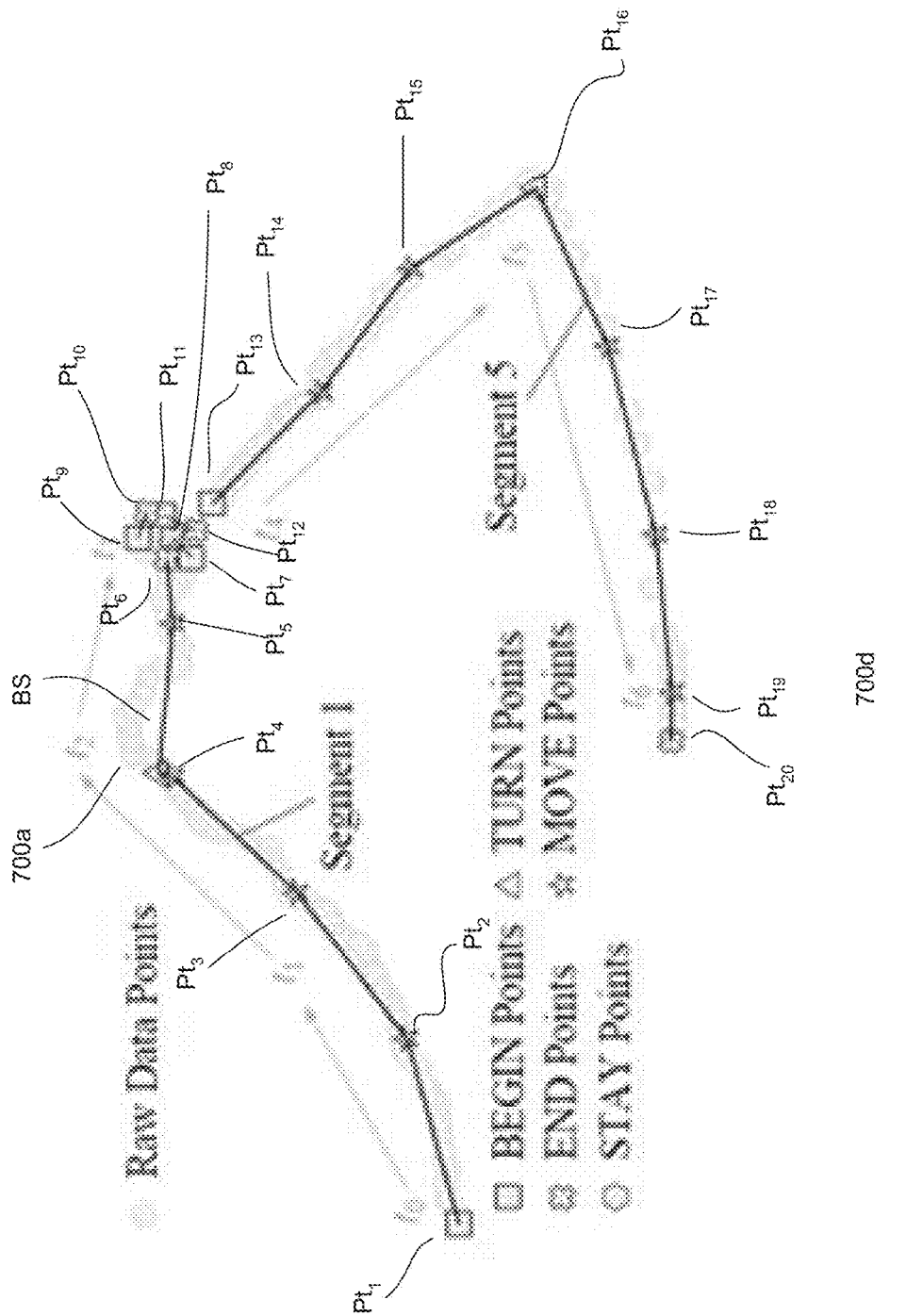

FIG. 9d shows another compressed trajectory 700d. The compressed trajectory is transposed over the raw data trajectory 700a (shadowed). The compressed trajectory is produced by decreasing $D_{min}$. This lowers the noise/error tolerance. The lower tolerance results in a cluster of data points $Pt_7$-$Pt_{12}$. For example, this cluster of data points corresponds to replacement of S point in the reference trajectory with three segments. Consequently, more segments are needed to represent the trajectory of the moving object. Additionally, a small blind spot BS exists between $Pt_4$ and $Pt_5$. The BS is similar in size to that of the trajectory of FIG. 9b. In other words, the compressed trajectory may have similar accuracy with respect to the BS, but at the expense of additional data point due to the lower noise/error tolerance.

Figure 9E:
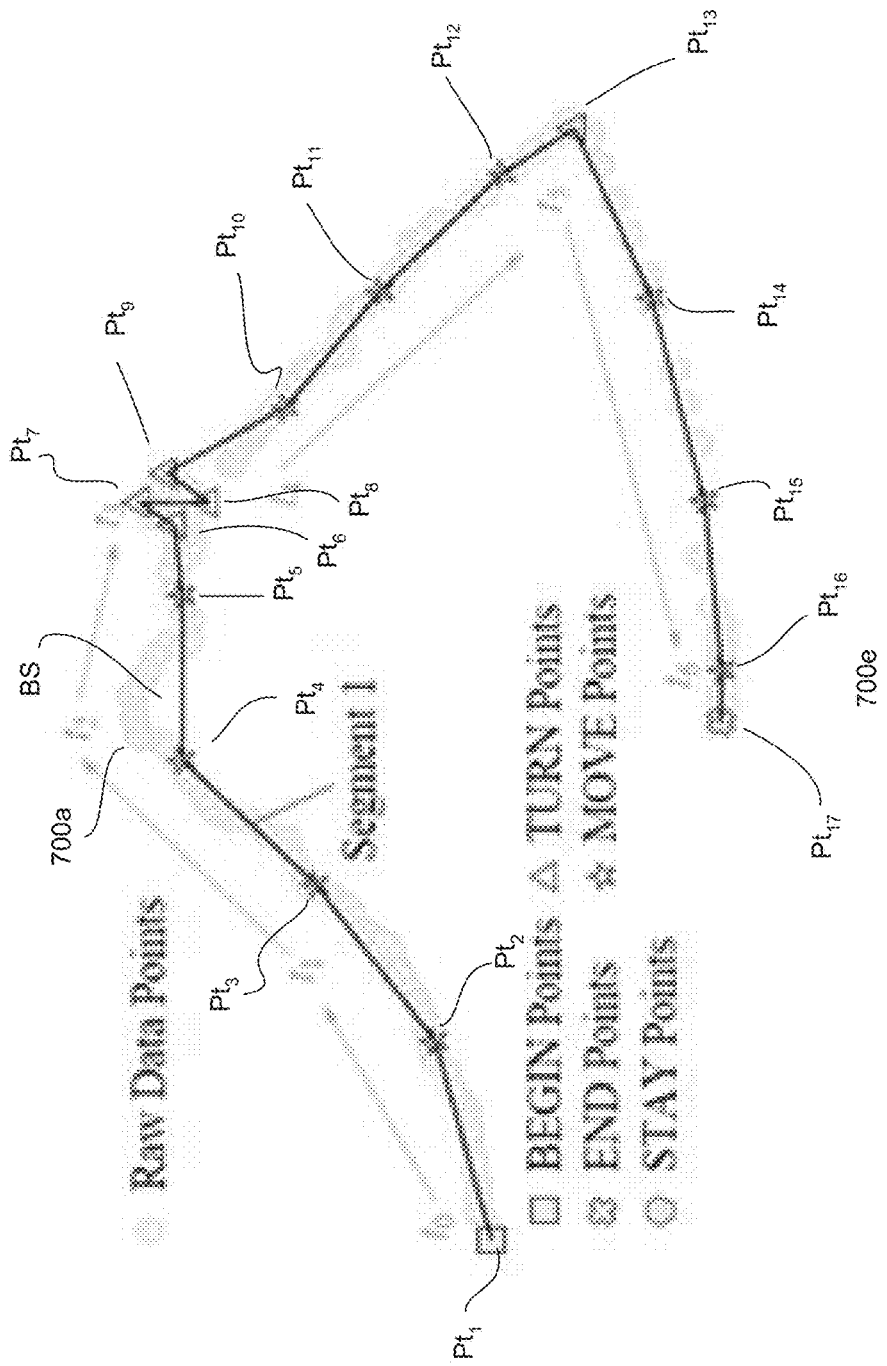

Referring to FIG. 9e, another embodiment of a compressed trajectory 700e is shown. The compressed trajectory is transposed over the raw data trajectory 700a (shadowed). The compressed trajectory includes data points $Pt_1$-$Pt_{17}$. The compressed trajectory is produced by increasing $T_{max}$. The accuracy of the compressed trajectory is relatively good, with only one blind spot BS, while using 17 data points.

The parameter $T_{max}$ determines how the trajectory is divided into different segments. Increasing $T_{max}$ causes a longer wait for the next data point. This, for example, causes a connection between segments, resulting in only a single segment, as compared to the reference trajectory of FIG. 9b. Although accuracy is comparable, it does not for segments. Reducing $T_{max}$ will provide greater segmentation in the trajectory, should the user desire to study trajectory breaks.

Figure 9F:
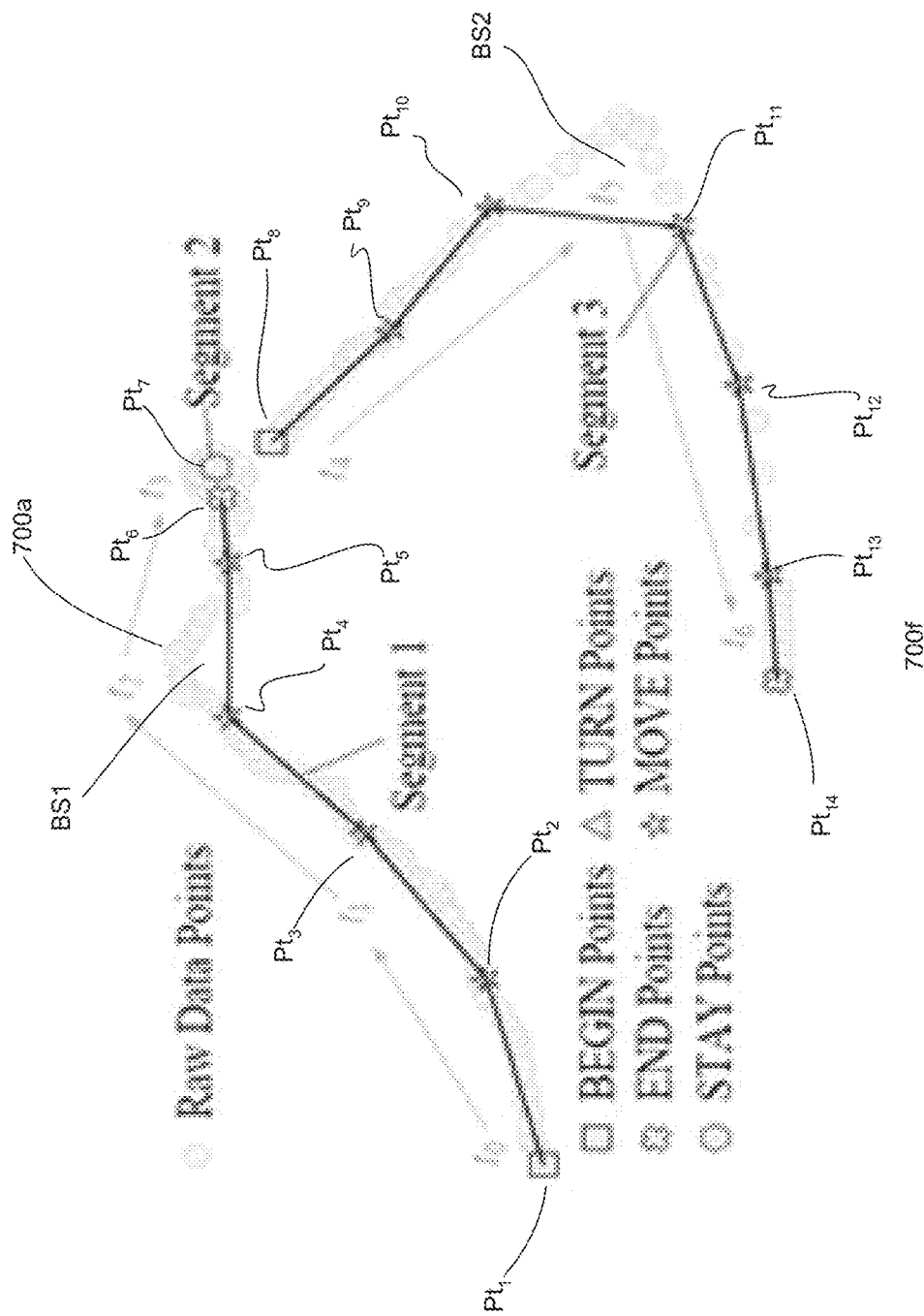

FIG. 9f shows another embodiment of a compressed trajectory 700f. The compressed trajectory is transposed over the raw data trajectory 700a (shadowed). The compressed trajectory is produced by increasing $\theta_{min}$. As discussed, the parameter $\theta_{min}$ determines turn points. Increasing $\theta_{min}$ produces larger or more blind spots. Illustratively, $\theta_{min}$ produces first and second blind spots BS1 and BS2. The compressed trajectory is represented by data points $Pt_1$-$Pt_{14}$. Although the compression ratio is better, it is achieved at the expense of reduced accuracy.

An experiment was performed. The experiment includes collecting Automatic Identification System (AIS) signals corresponding to ships in the Pasir Panjang Container Terminal in Singapore, one of the busiest ports in the world. The positioning data of over 3000 different ships were randomly sampled for a period of about three weeks. The raw data set includes 5708927 records of locations with ship ID and timestamp.

Although it is not real time data streaming, the data stream was simulated with stored data when compression was performed using OLDCAT_SBE and OLDCAT_MT procedures, as described. After compression, P' contained 92907 points, resulting in a compression ratio of 1.63%.

FIG. 10a shows a compressed trajectory 800a for a single ship. The ship's trajectory includes 9 segments. In particular, the trajectory indicates the movement of the ship into the port in segment 4, and then out of the port in segment 5. Segment 8 is a single STAY point. This plot shows that with as few as 1% of the data points, the movement of an object can be reconstructed with good accuracy.

Figure 10B:
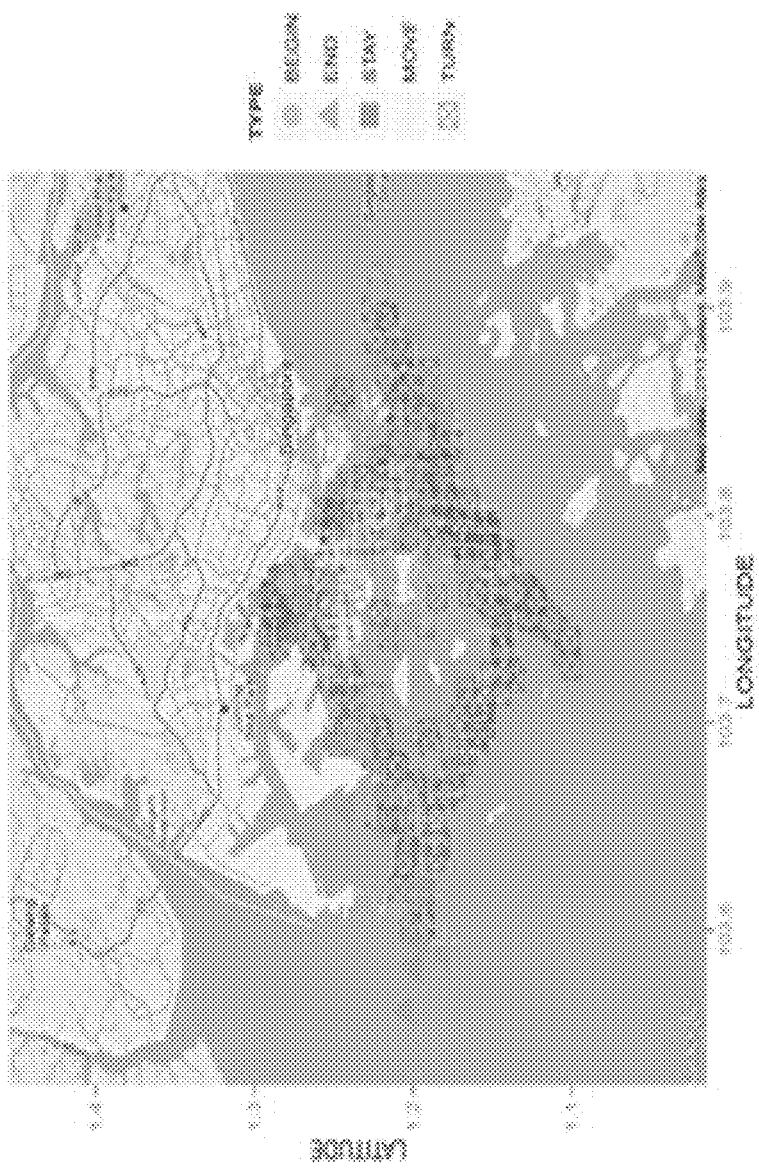

As for FIG. 10b, it shows overlays of trajectories 800b of 100 ships. Due to the high density of the points in the plot, it may be difficult to see the sequence of the points. Nevertheless, the ships' behavior can be determined by studying how the different types of the points in P' are distributed over the entire area. For example, a lot of ships make turns at the southern part of the area, indicated by high density of the turn points, while in the middle they simply keep moving straight ahead, indicated by the move points. By studying the movement of the ships based on the points, models can be developed. For example, models related to traffic control or regulation violations may be developed.

As illustrated by the experiment, movement of objects may be efficiently tracked on-line or off-line. Such information can be used to develop models, such as traffic models, or perform traffic analysis which can be used for traffic optimization as well as evaluation of traffic regulations. Efficiently tracking movement of objects may also be used to manage supply chains to facilitate customer behavioral analysis. Other applications may also be useful from analyzing trajectory data. The applications may depend on the type of trajectory data collected.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method for more efficiently compressing locational data and for performing real-time analytics of such locational data comprising
providing raw trajectory data of an object, the raw trajectory data relates to a physical trajectory of the object and is derived from a signal collection system;
processing, by a processor, the raw trajectory data to identify key data points from the raw trajectory data, the key data points include primary key data points and secondary key data points, wherein identifying the key data points is based on compression parameters comprising
$T_{max}$ which is the maximum time constant that when exceeded, indicates that the object is stationary,
$D_{min}$ which is the minimum distance control parameter to tolerate signal noises and error,
$D_{max}$ which is the maximum distance for indicating that the object is moving, and
$\theta_{min}$ which is the minimum angle for indicating that the object is turning, the compression parameters are used to
determine if a current data point under analysis $Pt_c$ is a primary key data point, wherein a primary key data point comprises begin (B) or end (E) points, and
in response to determining that the data point $Pt_c$ is not a primary key data point, determine if one or more data points in a temporary buffer ($P_{temp}$) is a secondary key data point, wherein a secondary key data point comprises a turn (T) point which indicates that the object is turning at an angle relative to a previous data point;
removing, by the processor, data points from the raw trajectory data which are not identified as key data points (non-key data points) thereby reducing an amount of data required to characterize the physical trajectory of the object;
storing the key data points as a set of compressed trajectory data points P' corresponding to a compressed trajectory of the object, the compressed trajectory represented by at least one segment, wherein
primary key data points define ends of the segment, and
secondary key data points are intermediate key data points between ends of the segment; and
analyzing, by the processor, the compressed data points to provide an analysis for developing traffic models, wherein the analysis comprises
determining accuracy and error tolerance of a data compression system by adjusting at least one of input compression parameters.

2. The method of claim 1 wherein:
the primary key data points further comprises a stay (S) point; and
the secondary key data points further comprises a move (M) point.

3. The method of claim 2 wherein:
the B point defines a beginning of the segment;
the E point defines an end of the segment; and
the S point defines the beginning and end of the segment.

4. The method of claim 1 wherein the turn point is determined based on a geometric theorem.

5. The method of claim 1 wherein the compression parameters comprise user defined compression parameters.

6. The method of claim 1 wherein the compression parameters comprise:
preset parameters defined by the system; and
an option for a user to override the preset parameters.

7. The method of claim 1 wherein the segment comprises a continuous line formed by connecting the key data points of the segment in series from earliest in time to latest in time.

8. The method of claim 7 wherein adjacent key data points of the segment form a sub-segment comprising a straight line.

9. The method of claim 8 wherein the compressed trajectory comprises a plurality of segments.

10. The method of claim 1 wherein providing the raw trajectory data comprises providing the raw trajectory data as a raw trajectory data stream.

11. The method of claim 10 wherein the raw trajectory data comprises raw trajectory data of a plurality of moving objects, the raw trajectory data includes object identifier, location information and time stamp information.

12. The method of claim 11 wherein processing the raw trajectory data comprises processing the raw trajectory data serially of one object at a time.

13. A method of more efficiently compressing trajectory data comprising:
providing raw trajectory data of an object, the raw trajectory data relates to a physical trajectory of the object;
processing, by a processor, the raw trajectory data to identify key data points from the raw trajectory data, the key data points include primary key data points and secondary key data points, wherein identifying the key data points is based on compression parameters, the compression parameters comprise
$T_{max}$ which is the maximum time constant that when exceeded, indicates that the object is stationary,
$D_{min}$ which is the minimum distance control parameter to tolerate signal noises and error,
$D_{max}$ which is the maximum distance for indicating that the object is moving, and
$\theta_{min}$ which is the minimum angle for indicating that the object is turning;
removing data points from the raw trajectory data which are not identified as key data points (non-key data points) thereby reducing an amount of data required to characterize the physical trajectory of the object;
storing the key data points as a set of compressed trajectory data points P' corresponding to a compressed trajectory of the object, the compressed trajectory represented by at least one segment, wherein
primary key data points define ends of the segment, and secondary key data points are intermediate key data points between ends of the segment; and analyzing, by the processor, the compressed data points to provide an analysis for developing traffic models, wherein the analysis comprises determining accuracy and error tolerance of a data compression system by adjusting at least one of input compression parameters.

14. The method of claim 13 wherein processing the raw trajectory data further comprises processing $Pt_c$, wherein processing $Pt_c$ includes:

designating $Pt_c$ as a B point if,
$Pt_c$ is a first data point of P',
Pt' is a S point, or
$t_c - t_{c-1} > t_c - t' > T_{max}$, where t' is the time of the last data point added to P', and changing Pt' to a S point, if Pt' is a B point and $t_c - t_{c-1} > T_{max}$, or
designating $Pt_{c-1}$ to a E point, if $t_c - t_{c-1} > T_{max}$ and Pt' is a M point or a T point;
storing $Pt_c$ in a temporary buffer $P_{temp}$ if $Pt_c$ is not designated as a B point; and
determining if $Pt_c$ is a secondary key data point if it is not designated as a B point.

15. The method of claim 14 wherein determining the secondary key data point comprises:

designating $Pt_c$ as a M point if Pt'$Pt_c > D_{max}$; and
determining if any data point in $P_{temp}$ is a T point.

16. A system for more efficiently compressing trajectory data comprising:

an input data source for receiving raw trajectory data characterizing physical movement of an object from a trajectory data collector;

a preprocessor for pre-processing the raw trajectory data;

a compressor for compressing the raw trajectory data to identify key data points from the raw trajectory data based on compression parameters thereby reducing an amount of data required to characterize the physical movement of the object, the compression parameters comprising $T_{max}$ which is the maximum time constant that when exceeded, indicates that the object is stationary, $D_{min}$ which is the minimum distance control parameter to tolerate signal noises and error, $D_{max}$ which is the maximum distance for indicating that the object is moving, and $\theta_{min}$ which is the minimum angle for indicating that the object is turning, wherein the compressor comprises, a primary module for identifying if a current data point ($Pt_c$) is a primary key data point, the primary module stores $Pt_c$ in a temporary buffer ($P_{temp}$) if $Pt_c$ is not a primary key data point, and a secondary module for processing $Pt_c$ and data points in $P_{temp}$ to determine if data point or data points in $P_{temp}$ are secondary key data points; and an output data source for storing the key data points identified by the compressor as a set of compressed trajectory data points P' corresponding to a compressed trajectory, the compressed trajectory represented by at least one segment, wherein primary key data points define ends of the segment, and
secondary key data points are intermediate key data points between ends of the segment: and analyzing, by the compressor, the compressed data points to provide an analysis for developing traffic models, wherein the analysis comprises determining accuracy and error tolerance of a data compression system by adjusting at least one of input compression parameters.

17. The system of claim 16 wherein:

the primary key data points comprises begin (B), end and stay (S) points; and
the secondary key data points comprises move (M) and turn (T) points.

18. The system of claim 17 wherein:

the B point defines a beginning of the segment;
the E point defines an end of the segment; and
the S point defines the beginning and end of the segment.

19. A non-transitory computer usable medium having a computer readable program code tangibly embodied therein, the computer readable program code adapted to be executed by a processor to implement a method of more efficiently compressing trajectory data comprising:

providing raw trajectory data of an object, the raw trajectory data relates to a physical trajectory of the object;

processing the raw trajectory data by the processor to identify key data points from the raw trajectory data, the key data points include primary key data points and secondary key data points, wherein identifying the key data points is based on compression parameters comprising $T_{max}$ which is the maximum time constant that when exceeded, indicates that the object is stationary,
$D_{min}$ which is the minimum distance control parameter to tolerate signal noises and error,
$D_{max}$ which is the maximum distance for indicating that the object is moving, and
$\theta_{min}$ which is the minimum angle for indicating that the object is turning, the compression parameters are used to determine if a current data point under analysis $Pt_c$ is a primary key data point, wherein a primary key data point comprises begin (B), end (E) or stationary (S) points, and in response to determining that the data point $Pt_c$ is not a primary key data point, determine if one or more data points in a temporary buffer ($P_{temp}$) is a secondary key data point, wherein a secondary key data point comprises a turn (T) point which indicates that the object is turning at an angle relative to a previous data point;

removing data points from the raw trajectory data which are not identified as key data points (non-key data points) thereby reducing an amount of data required to characterize the physical trajectory of the object;

storing the key data points as a set of compressed trajectory data points P' corresponding to a compressed trajectory of the object, the compressed trajectory represented by at least one segment, wherein primary key data points define ends of the segment, and
secondary key data points are intermediate key data points between ends of the segment and further comprises a move (M) point: and analyzing, by the processor, the compressed data points to provide an analysis for developing traffic models, wherein the analysis comprises determining accuracy and error tolerance of a data compression system by adjusting at least one of input compression parameters.

20. The non-transitory computer usable medium of claim 19 wherein processing the raw trajectory data further comprises processing $Pt_c$, wherein processing $Pt_c$ includes:

designating $Pt_c$ as a B point if,
$Pt_c$ is a first data point of P',
Pt' is a S point, or $t_c-t_{c-1}>t_c-t'>T_{max}$, where t' is the time of the last data point added to P', and changing Pt' to a S point if Pt' is a B point and $t_c-t_{c-1}>T_{max}$, or designating Ptc−1 to a E point if tc−tc−1>T max and Pt' is a M point or a T point; storing $Pt_c$ in a temporary buffer $P_{temp}$ if $Pt_c$ is not designated as a B point; and determining if $Pt_c$ is a secondary key data point if it is not designated as a B point.

\* \* \* \* \*